United States Patent
Shin et al.

(10) Patent No.: US 11,334,230 B2
(45) Date of Patent: May 17, 2022

(54) ELECTRONIC DEVICE AND SYSTEM FOR GENERATING 3D OBJECT BASED ON 3D RELATED INFORMATION

(71) Applicant: Samsung Electronics Co., Ltd., Gyeonggi-do (KR)

(72) Inventors: Sangmin Shin, Gyeonggi-do (KR); Donghoon Kang, Gyeonggi-do (KR); Jikwang Kang, Gyeonggi-do (KR); Zion Kwon, Gyeonggi-do (KR); Jeonghoon Kim, Gyeonggi-do (KR); Hojin Jeon, Gyeonggi-do (KR); Yeunwook Lim, Gyeonggi-do (KR)

(73) Assignee: Samsung Electronics Co., Ltd

( * ) Notice: Subject to any disclaimer, the term of this patent is extended or adjusted under 35 U.S.C. 154(b) by 0 days.

(21) Appl. No.: 16/437,892

(22) Filed: Jun. 11, 2019

(65) Prior Publication Data
US 2019/0377482 A1    Dec. 12, 2019

(30) Foreign Application Priority Data
Jun. 12, 2018    (KR) .......................... 10-2018-0067425

(51) Int. Cl.
*G06F 3/0484*    (2022.01)
*G06F 3/0488*    (2022.01)
(Continued)

(52) U.S. Cl.
CPC ........ *G06F 3/04845* (2013.01); *G06F 3/0488* (2013.01); *G06F 3/04162* (2019.05);
(Continued)

(58) Field of Classification Search
CPC ....... G06T 15/10; G06T 3/60; G06F 3/04845; G06F 3/04162; G06F 3/0488;
(Continued)

(56) References Cited

U.S. PATENT DOCUMENTS

| 7,880,726 B2 * | 2/2011 | Nakadaira ........... G06F 3/04815 345/173 |
| 2010/0130257 A1 | 5/2010 | Jang |

(Continued)

FOREIGN PATENT DOCUMENTS

| CN | 102375972 | 3/2012 |
| EP | 2 355 440 | 8/2011 |

(Continued)

OTHER PUBLICATIONS

KR-20120067421-A (Machine Translationon Mar. 19, 2020) (Year: 2012).*

(Continued)

*Primary Examiner* — Michael Le
(74) *Attorney, Agent, or Firm* — The Farrell Law Firm, P.C.

(57) ABSTRACT

Electronic device and system. Electronic device includes a housing, a touch screen display disposed within housing and exposed through at least a portion of housing, a camera, a wireless communication circuit disposed within housing, a position sensor, a motion sensor, a processor disposed within housing and operatively connected to display, camera, wireless communication circuit, position sensor, and motion sensor, and a memory disposed within housing and operatively connected to processor, wherein the memory is configured to store instructions causing, upon execution, the processor to capture an image by using the camera, receive the captured image from the camera, receive position data associated with the captured image from the position sensor, receive orientation data associated with the captured image from the motion sensor, receive a user input for adding an object to the captured image through the display, and transmit the object, the captured image, the position data, and the (Continued)

orientation data to an external server through the wireless communication circuit.

18 Claims, 27 Drawing Sheets

(51) Int. Cl.
  *H04N 5/262* (2006.01)
  *H04W 4/02* (2018.01)
  *G06F 3/041* (2006.01)
  *G06F 3/04845* (2022.01)
  *G06T 3/60* (2006.01)
  *G06T 15/10* (2011.01)

(52) U.S. Cl.
  CPC .......... *H04N 5/2621* (2013.01); *H04W 4/026* (2013.01); *G06F 2203/04104* (2013.01); *G06T 3/60* (2013.01); *G06T 15/10* (2013.01)

(58) Field of Classification Search
  CPC ....... G06F 2203/04104; G06F 3/04815; G06F 3/005; G06F 3/03545; G06F 3/0414; G06F 2203/04808; H04N 5/2621; H04W 4/026; H04W 4/33; G11B 27/031
  See application file for complete search history.

(56) References Cited

U.S. PATENT DOCUMENTS

| | | | |
|---|---|---|---|
| 2010/0207898 A1* | 8/2010 | Cha | G06F 3/04845 345/173 |
| 2011/0187744 A1 | 8/2011 | Kim et al. | |
| 2012/0147052 A1* | 6/2012 | Homma | G06F 3/044 345/660 |
| 2013/0117698 A1* | 5/2013 | Park | G06F 3/04817 715/765 |
| 2013/0147933 A1 | 6/2013 | Kulas | |
| 2015/0051835 A1* | 2/2015 | Jung | G06F 3/0238 701/533 |
| 2018/0004406 A1 | 1/2018 | Jung et al. | |
| 2018/0074676 A1 | 3/2018 | Lee et al. | |
| 2018/0107276 A1* | 4/2018 | Heubel | G06F 3/011 |
| 2019/0004688 A1* | 1/2019 | Bowen | G06T 11/60 |
| 2019/0065027 A1* | 2/2019 | Hauenstein | G06F 3/017 |
| 2019/0370594 A1* | 12/2019 | Gur | G06F 3/04845 |

FOREIGN PATENT DOCUMENTS

| | | | |
|---|---|---|---|
| KR | 20120067421 A | * | 6/2012 |
| KR | 1020120067421 | | 6/2012 |
| KR | 10-2013-0062754 | | 6/2013 |
| KR | 101528848 | | 6/2015 |
| KR | 10-1756948 | | 7/2017 |
| KR | 1020180028855 | | 3/2018 |

OTHER PUBLICATIONS

International Search Report dated Oct. 31, 2019 issued in counterpart application No. PCT/KR2019/007009, 3 pages.
European Search Report dated Apr. 28, 2021 issued in counterpart application No. 19818676.9-1203, 8 pages.

* cited by examiner

ELECTRONIC DEVICE AND SYSTEM FOR GENERATING 3D OBJECT BASED ON 3D RELATED INFORMATION

CROSS-REFERENCE TO RELATED APPLICATION(S)

This application is based on and claims priority under 35 U.S.C. § 119 to Korean Patent Application No. 10-2018-0067425, filed on Jun. 12, 2018, in the Korean Intellectual Property Office, the disclosure of which is incorporated by reference herein in its entirety.

BACKGROUND

1. Field

The disclosure relates to an electronic device and system for intuitively generating and processing an object, especially a three-dimensional object, in response to a touch-sensitive user input.

2. Description of Related Art

In recent years, the role of a display has become important in portable electronic devices. In particular, portable electronic devices having a touch-sensitive display such as a touch screen are capable of receiving various kinds of user inputs (e.g., a touch input, a stylus pen input, a hovering input, and the like) through the display and performing particular functions corresponding to the received user inputs.

A portable electronic device may display a user interface (e.g., an augmented reality (AR) interface) through a display and, based on the user interface, generate or store an object (e.g., content). That is, the portable electronic device may identify input data values in response to a user input and then generate or store a certain object based on the identified data values.

In order to generate such an object based on the AR interface, the electronic device may capture an image through a camera thereof and receive the captured image and position and orientation data associated with the captured image. Then, the electronic device may implement the AR interface based on the captured image, the position data, and the orientation data.

When generating a certain object (e.g., content) based on the AR interface, the electronic device needs information about the object to be generated (e.g., size, length, slope, height, area, and/or coordinate data such as coordinate values with respect to the X, Y and Z axes). In general, such object information may be data values entered by the user. For example, the electronic device may identify numerical values entered by the user and generate a certain object corresponding to the identified numerical values. In particular, for the generation of a three-dimensional object, the user further inputs numerical values for rotation information and depth information of the object. Unfortunately, this may cause operations of generating the object to be complicated.

SUMMARY

An aspect of the present disclosure provides a touch-sensitive environment that allows a user to easily input information about a three-dimensional (3D) object into an electronic device when the 3D object is generated in a user interface based on an AR interface and displaying a two-dimensional plane. This environment not only allows the user to easily input 3D related information (e.g., rotation information and depth information) into the electronic device through a touch input, but also allows the electronic device to generate the 3D object based on the 3D related information entered by the user.

In accordance with another aspect of the present disclosure, an electronic device is provided. The electronic device includes a housing; a touch screen display disposed within the housing and exposed through at least a portion of the housing; a camera; a wireless communication circuit disposed within the housing; a position sensor; a motion sensor; a processor disposed within the housing and operatively connected to the display, the camera, the wireless communication circuit, the position sensor, and the motion sensor; and a memory disposed within the housing and operatively connected to the processor, wherein the memory is configured to store instructions causing, upon execution, the processor to capture an image by using the camera, receive the captured image from the camera, receive position data associated with the captured image from the position sensor, receive orientation data associated with the captured image from the motion sensor, receive a user input for adding an object to the captured image through the display, and transmit the object, the captured image, the position data, and the orientation data to an external server through the wireless communication circuit.

In accordance with another aspect of the present disclosure, a system is provided. The system includes a network interface; a processor operatively connected to the network interface; and a memory operatively connected to the processor, wherein the memory is configured to store instructions causing, upon execution, the processor to receive first data from a first external electronic device including a display and a camera via the network interface, wherein the first data includes an image, position data associated with the image, orientation data associated with the image, and an object generated in response to a user input to be overlapped with the image, process the first data such that a direction of the object is applied on the image, based on, at least in part, the position data, the orientation data, or the user input received from the first external electronic device, and transmit the processed first data to another external electronic device via the network interface.

BRIEF DESCRIPTION OF THE DRAWINGS

The above and other aspects, features, and advantages of certain embodiments of the present disclosure will be more apparent from the following description taken in conjunction with the accompanying drawings, in which.

DETAILED DESCRIPTION

Various embodiments of the present disclosure are described below in detail with reference to the accompanying drawings.

Figure 1:
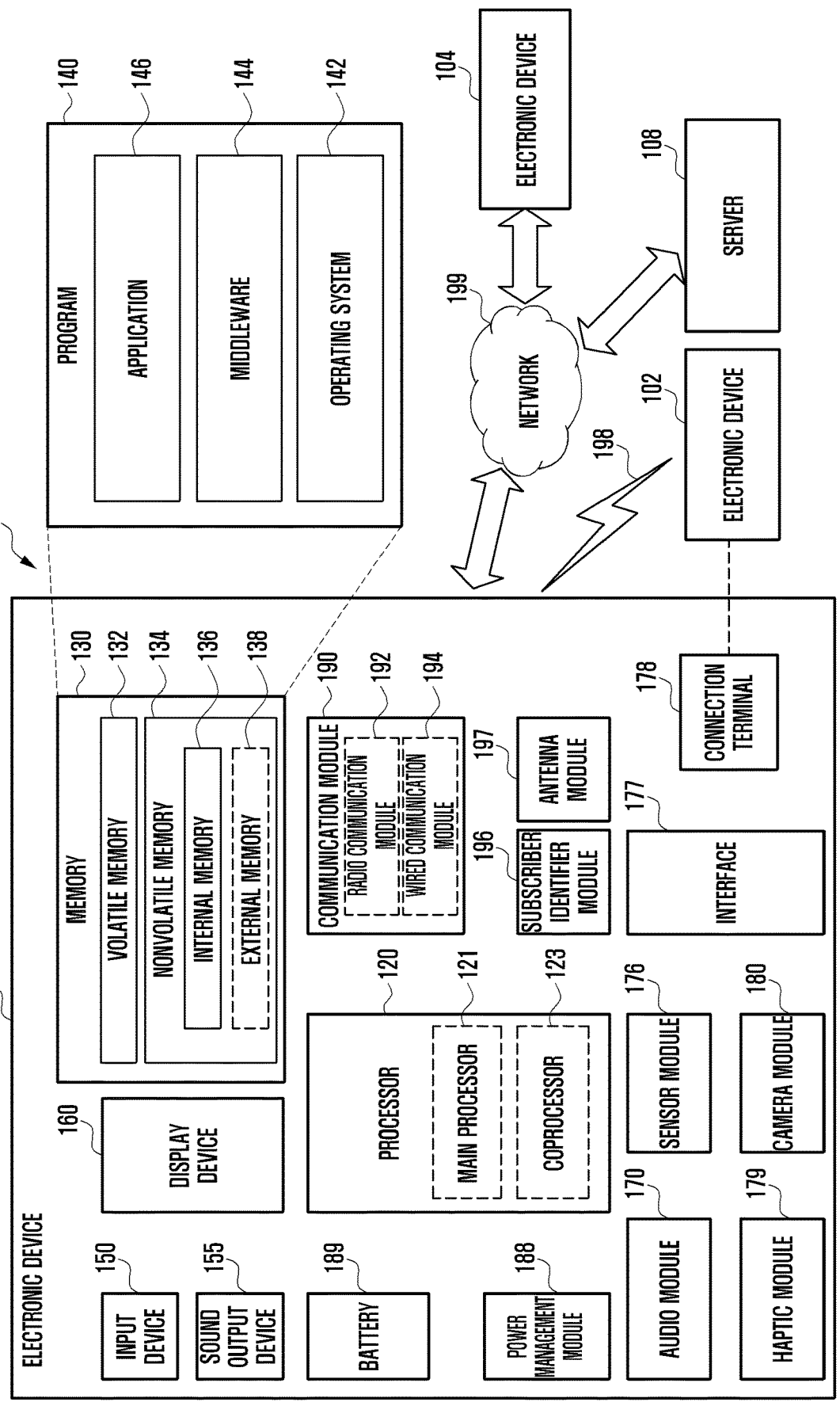
FIG. 1 is a block diagram of an electronic device in a network environment according to an embodiment.

FIG. 1 is a block diagram of an electronic device 101 in a network environment 100 according to an embodiment.

Referring to FIG. 1, the electronic device 101 in the network environment 100 may communicate with an electronic device 102 via a first network 198 (e.g., a short-range wireless communication network), or an electronic device 104 or a server 108 via a second network 199 (e.g., a long-range wireless communication network). According to an embodiment, the electronic device 101 may communicate with the electronic device 104 via the server 108. The electronic device 101 may include a processor 120, memory 130, an input device 150, a sound output device 155, a display device 160, an audio module 170, a sensor module 176, an interface 177, a connection terminal 178, a haptic module 179, a camera module 180, a power management module 188, a battery 189, a communication module 190, a subscriber identification module (SIM) 196, or an antenna module 197. At least one (e.g., the display device 160 or the camera module 180) of the components may be omitted from the electronic device 101, or one or more other components may be added in the electronic device 101. Some of the components may be implemented as single integrated circuitry. For example, the sensor module 176 (e.g., a fingerprint sensor, an iris sensor, or an illuminance sensor) may be implemented as embedded in the display device 160 (e.g., a display).

The processor 120 may execute, for example, software (e.g., a program 140) to control at least one other component (e.g., a hardware or software component) of the electronic device 101 coupled with the processor 120, and may perform various data processing or computation. According to an embodiment, as at least part of the data processing or computation, the processor 120 may load a command or data received from another component (e.g., the sensor module 176 or the communication module 190) in volatile memory 132, process the command or the data stored in the volatile memory 132, and store resulting data in non-volatile memory 134. The processor 120 may include a main processor 121 (e.g., a central processing unit (CPU) or an application processor (AP)), and a coprocessor 123 (e.g., a graphics processing unit (GPU), an image signal processor (ISP), a sensor hub processor, or a communication processor (CP)) that is operable independently from, or in conjunction with, the main processor 121. Additionally or alternatively, the coprocessor 123 may be adapted to consume less power than the main processor 121, or to be specific to a specified function. The coprocessor 123 may be implemented as separate from, or as part of the main processor 121.

The coprocessor 123 may control at least some of functions or states related to at least one component (e.g., the display device 160, the sensor module 176, or the communication module 190) among the components of the electronic device 101, instead of the main processor 121 while the main processor 121 is in an inactive (e.g., sleep) state, or together with the main processor 121 while the main processor 121 is in an active state (e.g., executing an application). According to an embodiment, the coprocessor 123 (e.g., an ISP or a CP) may be implemented as part of another component (e.g., the camera module 180 or the communication module 190) functionally related to the auxiliary processor 123.

The memory 130 may store various data used by at least one component (e.g., the processor 120 or the sensor module 176) of the electronic device 101. The various data may include, for example, software (e.g., the program 140) and input data or output data for a command related thereto. The memory 130 (e.g., dynamic random access memory (DRAM), static RAM (SRAM) or synchronous DRAM (SDRAM)) may include the volatile memory 132 or the non-volatile memory 134.

The program 140 may be stored in the memory 130 as software, and may include, for example, an operating system (OS) 142, middleware 144, or an application 146 (e.g., an application program).

The input device 150 may receive a command or data to be used by another component (e.g., the processor 120) of the electronic device 101, from the outside (e.g., a user) of the electronic device 101. The input device 150 may include, for example, a microphone, a mouse, or a keyboard.

According to an embodiment, the processor 120 may sense an input of a stylus pen on the display device 160 (e.g., a touch screen). The stylus pen having a separate resonance circuit therein may interact with an electromagnetic induction panel (e.g., a digitizer) contained in the display device 160. The stylus pen may be implemented using a technique of electro-magnetic resonance (EMR), active electrical stylus (AES), or electric coupled resonance (ECR).

The sound output device 155 may output sound signals to the outside of the electronic device 101. The sound output device 155 may include, for example, a speaker or a receiver. The speaker may be used for general purposes, such as playing multimedia or playing a record, and the receiver may be used for incoming calls. According to an embodiment, the receiver may be implemented as separate from, or as part of, the speaker.

The display device 160 may visually provide information to the outside (e.g., a user) of the electronic device 101. The display device 160 may include, for example, a display, a hologram device, or a projector and control circuitry to control a corresponding one of the display, hologram device, and projector. According to an embodiment, the display device 160 may include touch circuitry adapted to detect a touch, or sensor circuitry (e.g., a pressure sensor) adapted to measure the intensity of force incurred by the touch.

The audio module 170 may convert a sound into an electrical signal and vice versa. According to an embodiment, the audio module 170 may obtain the sound via the input device 150, or output the sound via the sound output device 155 or a headphone of an external electronic device (e.g., an electronic device 102) directly (e.g., wired) or wirelessly coupled with the electronic device 101.

The sensor module 176 may detect an operational state (e.g., power or temperature) of the electronic device 101 or an environmental state (e.g., a state of a user) external to the electronic device 101, and then generate an electrical signal or data value corresponding to the detected state. According to an embodiment, the sensor module 176 may include, for example, a gesture sensor, a gyro sensor, an atmospheric pressure sensor, a magnetic sensor, an acceleration sensor, a grip sensor, a proximity sensor, a color sensor, an infrared (IR) sensor, a biometric sensor, a temperature sensor, a humidity sensor, or an illuminance sensor.

The interface 177 may support one or more specified protocols to be used for the electronic device 101 to be coupled with the external electronic device (e.g., the electronic device 102) directly (e.g., wired) or wirelessly. According to an embodiment, the interface 177 may include, for example, a high definition multimedia interface (HDMI), a universal serial bus (USB) interface, a secure digital (SD) card interface, or an audio interface.

The connection terminal 178 may include a connector via which the electronic device 101 may be physically connected with the external electronic device (e.g., the electronic device 102). According to an embodiment, the connection terminal 178 may include, for example, an HDMI connector, a USB connector, an SD card connector, or an audio connector (e.g., a headphone connector).

The haptic module 179 may convert an electrical signal into a mechanical stimulus (e.g., a vibration or a movement) or an electrical stimulus which may be recognized by a user via the user's tactile sensation or kinesthetic sensation. According to an embodiment, the haptic module 179 may include, for example, a motor, a piezoelectric element, or an electric stimulator.

The camera module 180 may capture a still image or moving images. According to an embodiment, the camera module 180 may include one or more lenses, image sensors, image signal processors, or flashes.

According to an embodiment, the processor 120 may capture an image by using the camera module 180 and implement an AR interface based on the captured image. In addition, the processor 120 may display the implemented AR interface through the display device 160.

The power management module 188 may manage power supplied to the electronic device 101. According to one embodiment, the power management module 188 may be implemented as at least part of, for example, a power management integrated circuit (PMIC).

The battery 189 may supply power to at least one component of the electronic device 101. According to an embodiment, the battery 189 may include, for example, a primary cell which is not rechargeable, a secondary cell which is rechargeable, or a fuel cell.

The communication module 190 may support establishing a direct (e.g., wired) communication channel or a wireless communication channel between the electronic device 101 and the electronic device 102, the electronic device 104, or the server 108 and performing communication via the established communication channel. The communication module 190 may include one or more communication processors that are operable independently from the processor 120 (e.g., the AP) and supports a direct (e.g., wired) communication or a wireless communication. According to an embodiment, the communication module 190 may include a radio communication module 192 (e.g., a cellular communication module, a short-range wireless communication module, or a global navigation satellite system (GNSS) communication module) or a wired communication module 194 (e.g., a local area network (LAN) communication module or a power line communication (PLC) module). A corresponding one of these communication modules may communicate with the external electronic device via the first network 198 (e.g., a short-range communication network, such as Bluetooth™, wireless-fidelity (Wi-Fi) direct, or a standard of the Infrared Data Association (IrDA)) or the second network 199 (e.g., a long-range communication network, such as a cellular network, the Internet, or a computer network (e.g., LAN or wide area network (WAN)). These various types of communication modules may be implemented as a single component (e.g., a single integrated circuit or chip), or may be implemented as multi components (e.g., multi chips) separate from each other. The radio communication module 192 may identify and authenticate the electronic device 101 in a communication network, such as the first network 198 or the second network 199, using subscriber information (e.g., international mobile subscriber identity (IMSI)) stored in the SIM 196.

The antenna module 197 may transmit or receive a signal or power to or from the outside (e.g., the external electronic device) of the electronic device 101. According to an embodiment, the antenna module 197 may include one or more antennas, and, therefrom, at least one antenna appropriate for a communication scheme used in the communication network, such as the first network 198 or the second network 199, may be selected, for example, by the communication module 190 (e.g., the radio communication module 192). The signal or the power may then be transmitted or received between the communication module 190 and the external electronic device via the selected at least one antenna.

At least some of the above-described components may be coupled mutually and communicate signals (e.g., commands or data) therebetween via an inter-peripheral communication scheme (e.g., a bus, a general purpose input and output (GPIO), a serial peripheral interface (SPI), or a mobile industry processor interface (MIPI)).

According to an embodiment, commands or data may be transmitted or received between the electronic device 101 and the external electronic device 104 via the server 108 coupled with the second network 199. Each of the electronic devices 102 and 104 may be a device of a same type as, or a different type, from the electronic device 101. All or some operations to be executed at the electronic device 101 may be executed at one or more of the external electronic devices 102, 104, or 108. For example, if the electronic device 101 should perform a function or a service automatically, or in response to a request from a user or another device, the electronic device 101, instead of, or in addition to, executing the function or the service, may request the one or more external electronic devices to perform at least part of the function or the service. The one or more external electronic devices receiving the request may perform the at least part of the function or the service requested, or an additional function or an additional service related to the request, and transfer an outcome of the performing to the electronic device 101. The electronic device 101 may provide the outcome, with or without further processing of the outcome, as at least part of a reply to the request. To that end, a cloud computing, distributed computing, or client-server computing technology may be used, for example.

Figure 2:
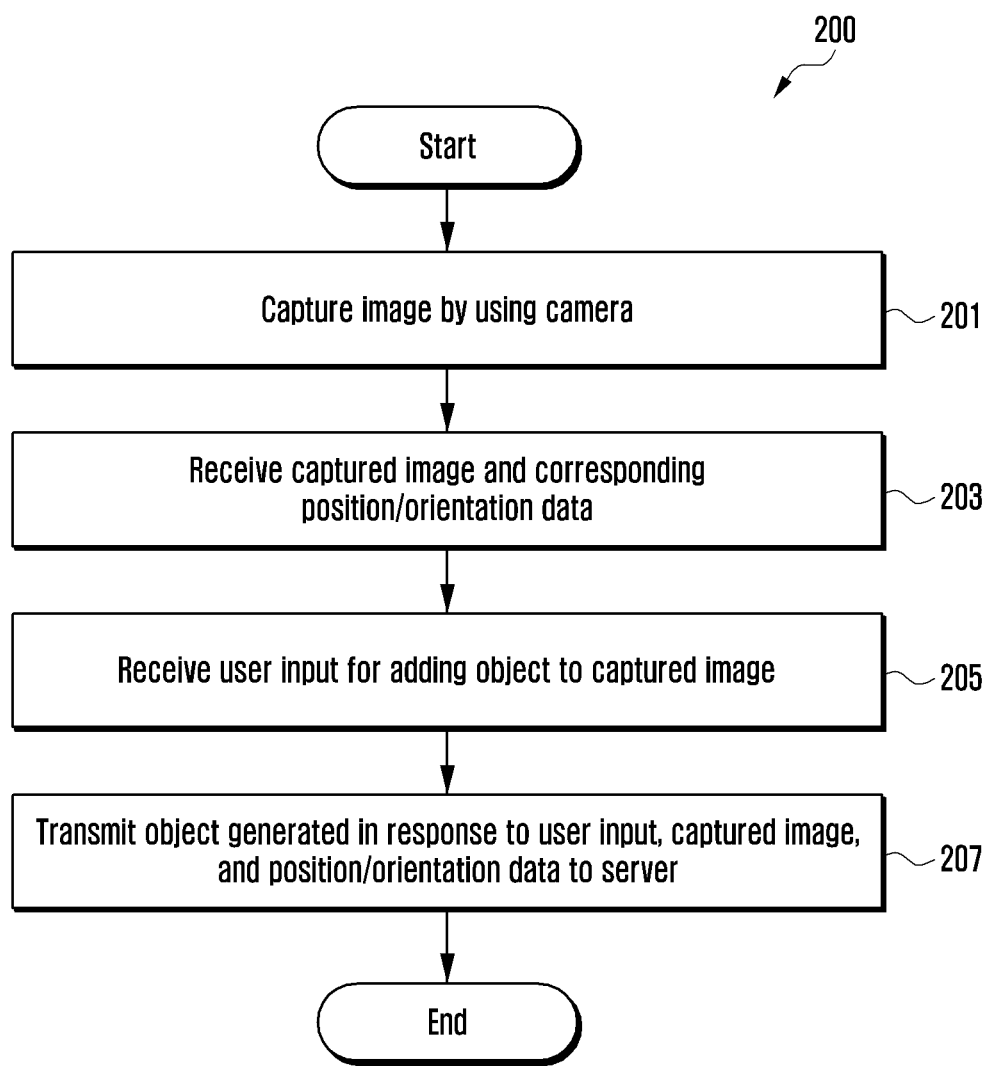
FIG. 2 is a flowchart of a method for generating an object based on an augmented reality interface according to an embodiment.

FIG. 2 is a flowchart of a method for generating an object based on an augmented reality interface according to an embodiment.

At step 201, a processor 120 of an electronic device 101 may capture an image by using a camera module 180. For example, the processor 120 may activate the camera 180 and capture a still image through the activated camera 180.

At step 203, the processor 120 may receive the captured image and position and orientation data associated with the captured image. For example, the processor 120 may receive the position data associated with the captured image by using a position sensor (e.g., the sensor module 176 of FIG. 1) and also receive the orientation data associated with the captured image by using a motion sensor (e.g., the sensor module 176 of FIG. 1). The position data may include data on coordinates where the electronic device 101 is located, and the orientation data may include data on a direction that the camera 180 of the electronic device 101 is facing. According to an embodiment, the electronic device 101 may implement an AR interface, based on the captured image and the position and orientation data associated with the captured image.

At step 205, the processor 120 may receive a user input (e.g., a stylus pen input) for adding an object to the captured image. For example, the processor 120 may receive a user input through an input device 150, based on the implemented AR interface. This user input may include a touch input for generating an object (e.g., content). According to an embodiment, this object may include text, a symbol, a geometric form, or an image.

At step 207, the processor 120 may transmit the object generated in response to the user input, the captured image, the position data, and the orientation data to a server 108. In addition, the processor 120 may store the generated object in a memory 130. In an embodiment, the processor 120 may transmit the generated object, the image captured at step 201, and the position/orientation data received at step 203 to the server 108 at least in part.

As described hereinbefore, the electronic device 101 may capture a certain image through the camera 180 and receive position and orientation data associated with the captured image. Then, the electronic device 101 may implement an AR interface, based on the captured image, the received position data, and the received orientation data. In addition, the electronic device 101 may receive a user input through the AR interface and then generate an object in response to the received user input. In addition, the electronic device 101 may store the generated object in the memory 130 and transmit the generated object, the captured image, the position data, and the orientation data to the server.

Figure 3A:
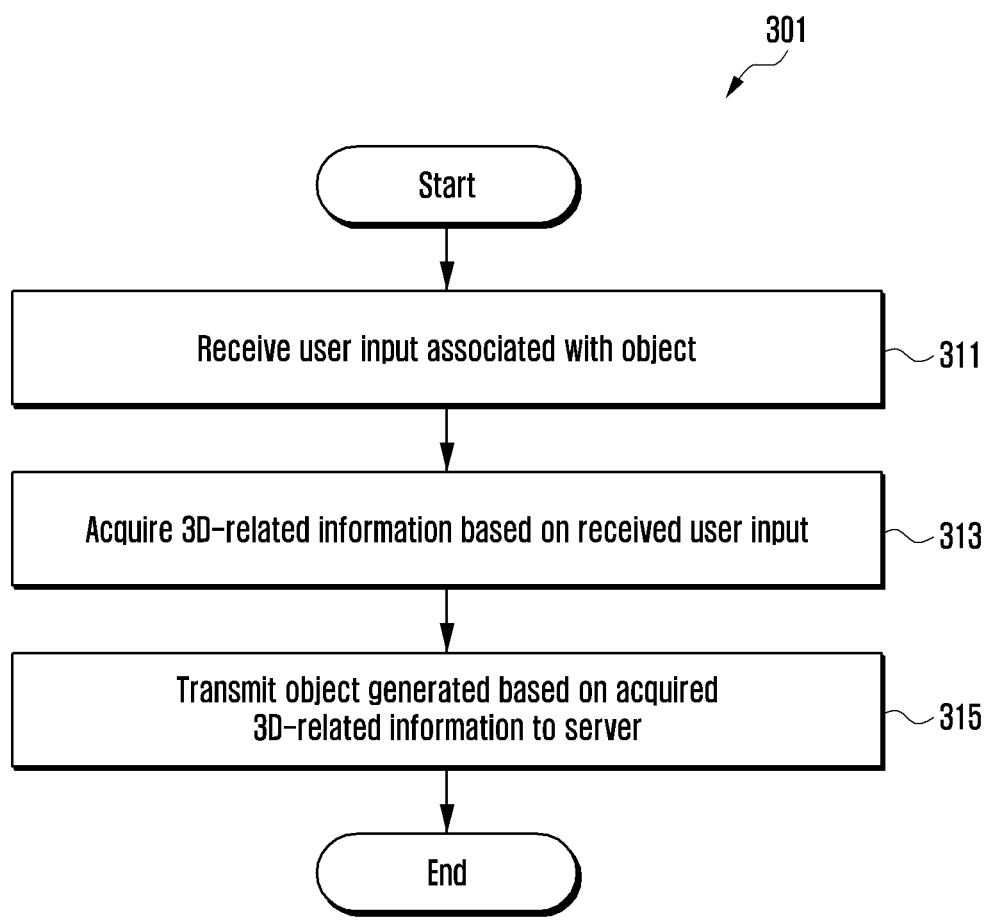
FIGS. 3A and 3B are flowcharts of methods for generating a 3D object according to embodiments.
Figure 3B:
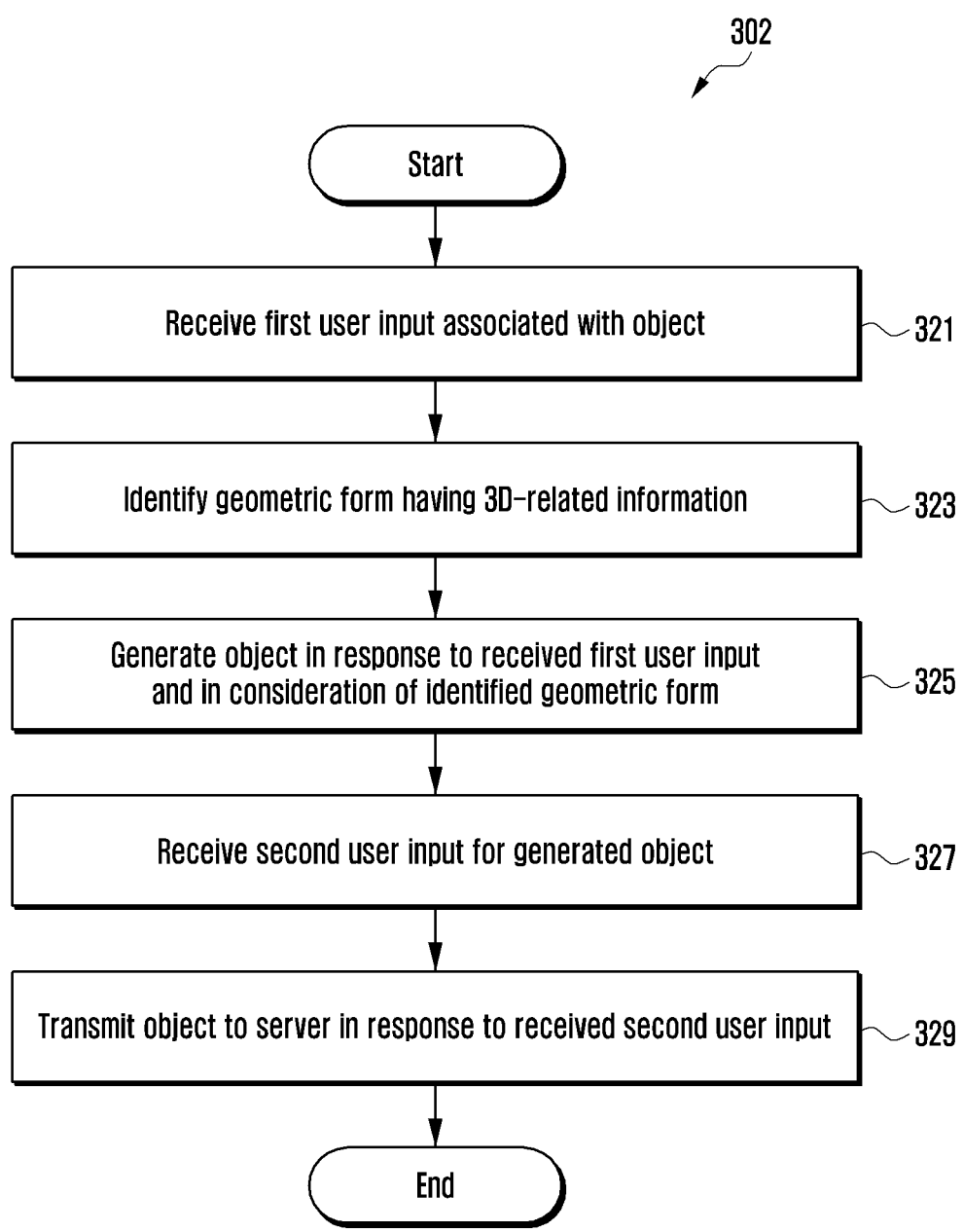

FIGS. 3A and 3B are flowcharts 301 and 302 of methods for generating a 3D object according to embodiments.

Referring to FIG. 3A, flowchart 301 regards a method for generating a 3D object. Flowchart 301 may correspond to the above-described steps 205 and 207 in FIG. 2.

At step 311, a processor 120 of an electronic device 101 may receive a user input associated with an object (or content). For example, the processor 120 may display a user interface to be used for generating the object through a display such as a touch screen display (e.g., the display device 160 of FIG. 1) and receive a user input through the user interface. The user input may include a touch input by a finger or a touch input by a pen (e.g., a stylus pen). According to an embodiment, the user interface may be an AR interface. For example, the processor 120 may activate the camera module 180, capture a certain image through the activated camera, display the captured image through the display, and implement the AR interface based on the captured image.

At step 313, the processor 120 may acquire 3D-related information for generating the object from the received user input. For example, the processor 120 may acquire the 3D-related information (e.g., data on coordinates, angle, slope, width, length, height, and/or area) about the object (e.g., text, a geometric form, etc.) to be generated in accordance with the received user input.

At step 315, the processor 120 may transmit the object, generated based on the acquired 3D-related information, to the server 108. For example, the processor 120 may generate the object based on the acquired 3D-related information, display the generated object on the display 160, and store the generated object in the memory 130. In addition, the processor 120 may transmit the generated object to an external electronic device (e.g., the server 108).

As described above, the electronic device 101 may receive a user input through the display 160 and then acquire 3D-related information for generating an object from the received user input. In addition, the electronic device 101 may generate the object based on the acquired 3D-related information, display the generated object on the display 160, store the generated object in the memory 130, and transmit the generated object to the server 108.

Referring to FIG. 3B, flowchart 302 regards a method for generating a 3D object. Flowchart 302 may correspond to the above-described steps 205 and 207 in FIG. 2.

At step 321, a processor 120 of an electronic device 101 may receive a first user input associated with an object. For example, the processor 120 may receive a user input of writing a text object "HELLO" through the display (e.g., the touch screen display).

At step 323, the processor 120 may identify a geometric form having 3D-related information. For example, the processor 120 may receive an input of constructing a certain geometric form on the display and identify the geometric form from the received input. The geometric form may have 3D-related information such as length, height, and slope, so that the processor 120 may also identify the 3D-related information from the identified geometric form.

Although it is described that step 323 is performed after step 321, step 323 may be alternatively performed before step 321. The geometric form having the 3D-related information may be in connection with the first user input received at step 321. In one example described above, the input of constructing the geometric form may be received after the first user input associated with the object is received. However, in another example, the processor 120 may identify the geometric form having the 3D-related information and then receive the first user input associated with the object. For example, the processor 120 may recognize the first user input in a certain region defined by the geometric form.

At step 325, the processor 120 may generate the object in response to the first user input and in consideration of the identified geometric form. For example, considering the 3D-related information of the identified geometric form, the processor 120 may generate a certain object corresponding to the first user input. That is, the generated object may be a 3D object to which the 3D-related information is applied.

At step 327, the processor 120 may receive a second user input for the generated object. For example, the second user input may be at least one input that directly touches the generated object. For example, the second user input may include a drag input.

At step 329, the processor 120 may transmit the object to the server 108 in response to the received second user input. For example, when the second user input is a drag input for the object, the processor 120 may move the object in response to the drag input. At this time, the processor 120 may display real-time dragged states of the object through the display 160. In addition, the processor 120 may store information (e.g., a position, coordinates, a slope, a width, a length, etc.) related to the object in the memory 130 and transmit the object to an external electronic device (e.g., the server 108).

FIGS. 4A, 4B, 4C, and 4D are illustrations of generating a 3D object according to an embodiment.

Figure 4A:
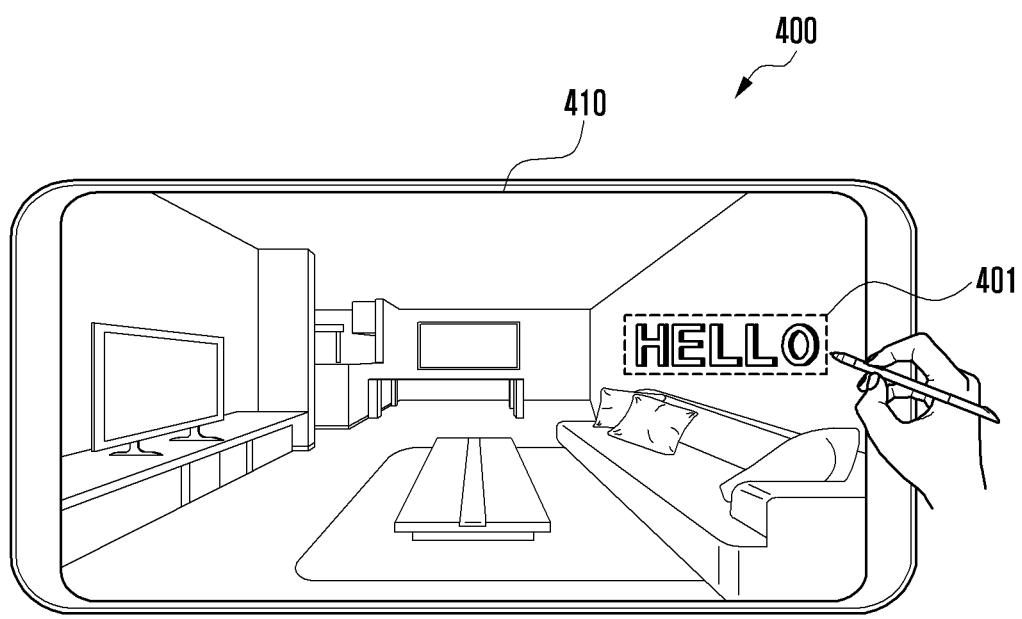
FIGS. 4A, 4B, 4C, and 4D are illustrations of generating a 3D object according to an embodiment.

Referring to FIG. 4A, a processor 120 of an electronic device 400 may display a 3D-based user interface (e.g., the AR interface) through a display 410 such as a touch screen display. For example, the 3D-based user interface may include a 3D image, a photograph, a picture, or a real-time preview image being obtained through the camera module 180. The processor 120 may receive a user input for generating a 3D object on the 3D-based user interface. For example, the processor 120 may receive a first user input of writing a text object 401 (e.g., "HELLO") and display the text object 401 on the display 410. This user input may be a user's touch input via a finger or a stylus pen. According to an embodiment, the object generated in response to this user input is not limited to the text object 401.

Figure 4B:
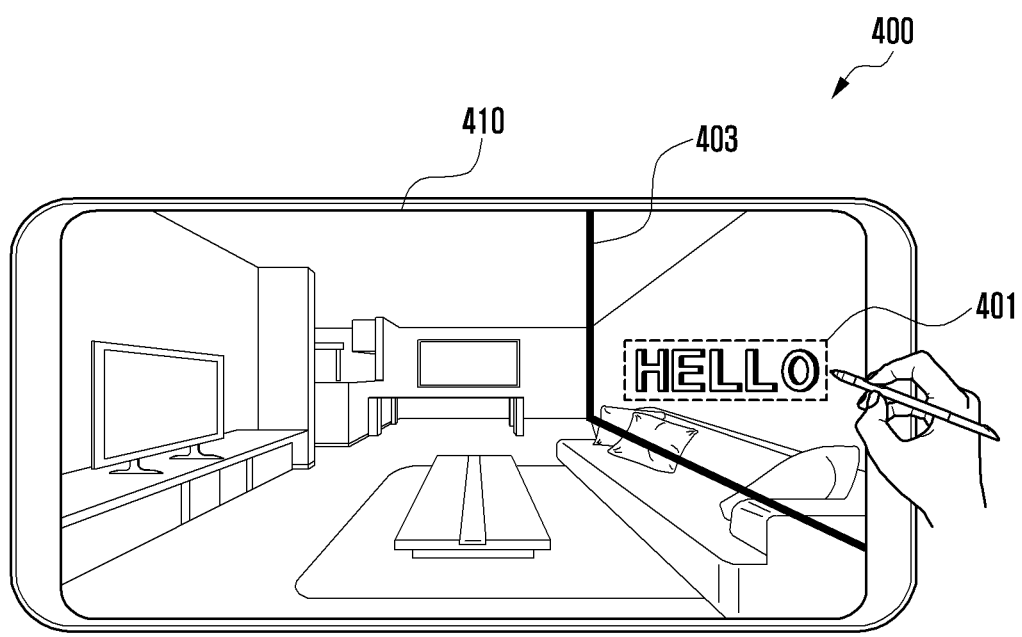

Referring to FIG. 4B, the processor 120 may receive a second user input of constructing a certain geometric form 403 (e.g., defining a 3D-based plane in the 3D-based user interface) which surrounds, at least in part, the text object 401. Then, the processor 120 may identify the geometric form 403 from the received second user input, and display the identified geometric form 403 on the display 410. This geometric form 403 may have 3D-related information such as data on coordinates, angle, slope, width, length, height, and/or area. Thus, the processor 120 may acquire the 3D-related information from the identified geometric form 403.

Figure 4C:
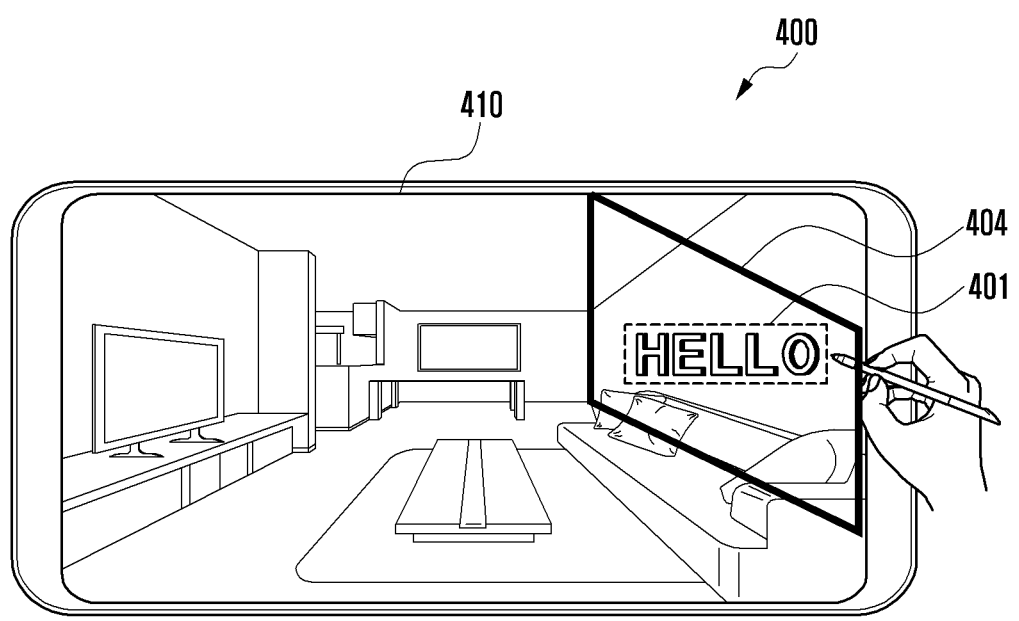

Referring to FIG. 4C, the processor 120 may receive a third user input of constructing a complete geometric form 404 which completely surrounds the text object 401. Then, the processor 120 may identify the complete geometric form 404 from the received third user input, display the identified geometric form 404 on the display 410, and acquire the 3D-related information from the identified geometric form 404. That is, based on the second and third user inputs, the complete geometric form 404 desired by the user is constructed to surround the text object 401. As a result, the text object 401 such as "HELLO" is contained within the complete geometric form 404.

Figure 4D:
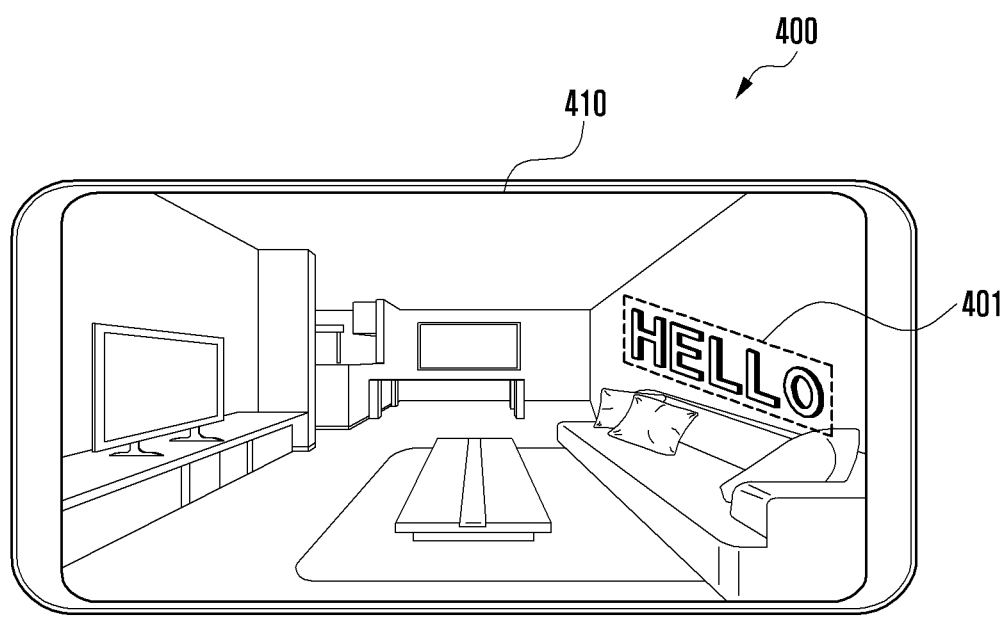

Referring to FIG. 4D, the processor 120 may modify the shape of the text object 401, based on the complete geometric form 404. For example, in accordance with the acquired 3D-related information of the complete geometric form 404, the processor 120 may change corresponding 3D-related information of the text object 401.

FIGS. 5A, 5B, 5C, 5D, and 5E are illustrations of generating a 3D object according to an embodiment.

Figure 5A:
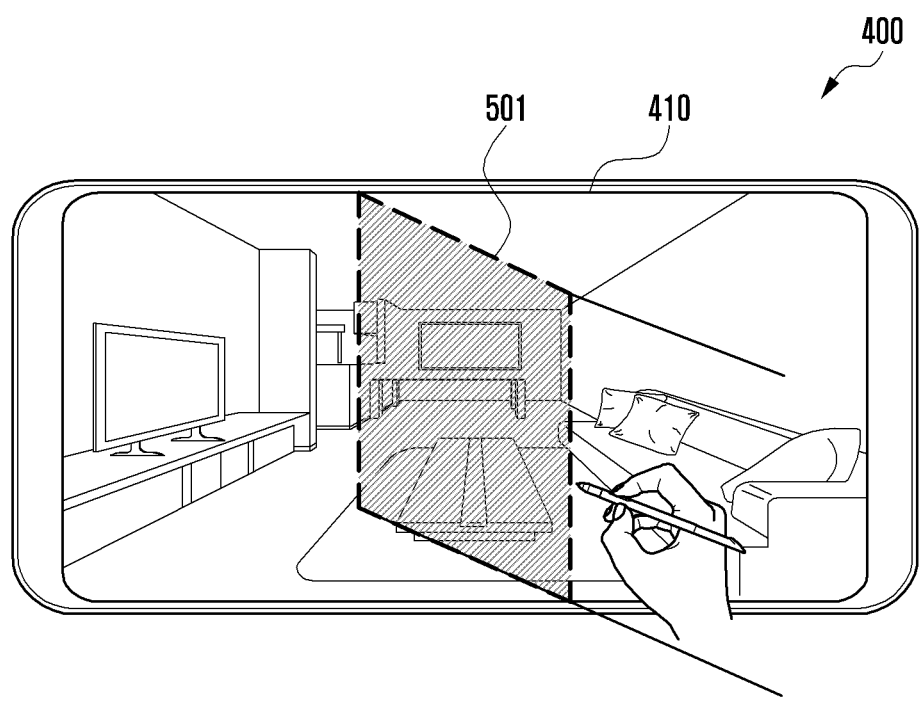
FIGS. 5A, 5B, 5C, 5D, and 5E are illustrations of generating a 3D object according to an embodiment.

Referring to FIG. 5A, a processor 120 of an electronic device 400 may display a 3D-based user interface (e.g., the AR interface) through a display 410 such as a touch screen display. In addition, the processor 120 may receive a first user input of constructing a certain geometric form 501 that defines, for example, a 3D-based plane in the 3D-based user interface. Then, the processor 120 may identify the geometric form 501 from the received first user input, and display the identified geometric form 501 on the display 410. The first user input may be a user's touch input via a finger or a stylus pen. The geometric form 501 may have 3D-related information such as data on coordinates, angle, slope, width, length, height, and/or area. Thus, the processor 120 may acquire the 3D-related information from the identified geometric form 501.

Figure 5B:
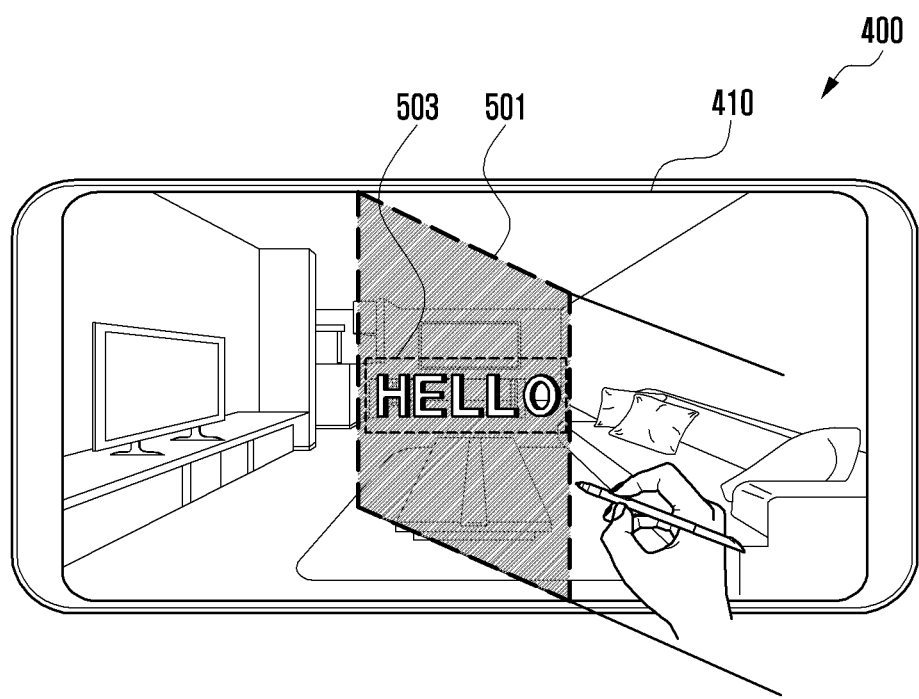

Referring to FIG. 5B, the processor 120 may receive a second user input within the geometric form 501 displayed in the 3D-based user interface. The second user input is for generating a 3D object. For example, the processor 120 may receive the second user input of writing a text object 503 "HELLO" and display the text object 503 within the geometric form 501 on the display 410.

Figure 5C:
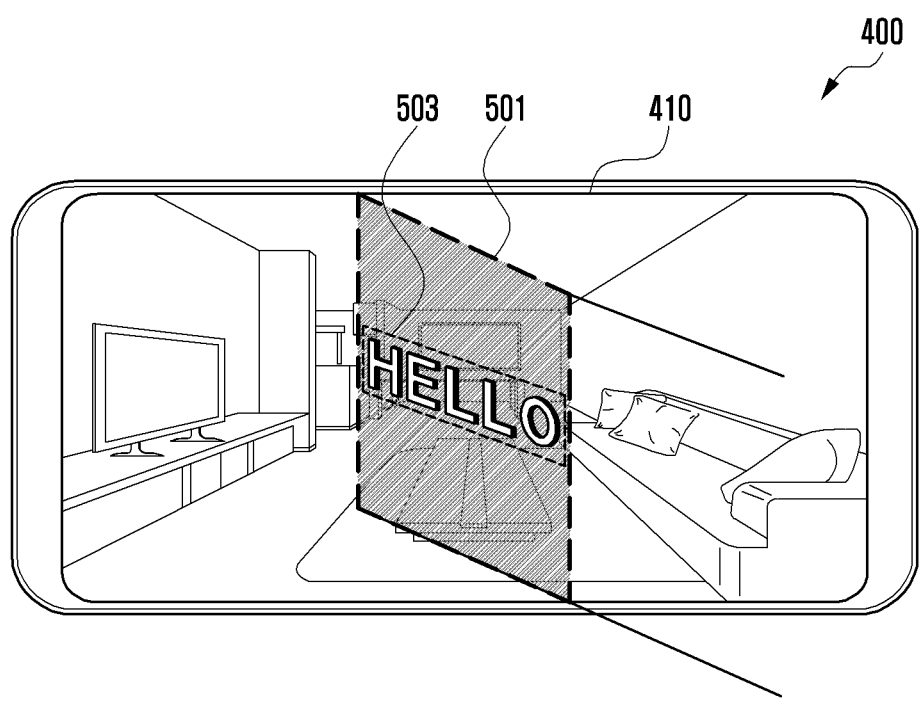

Referring to FIG. 5C, the processor 120 may modify the shape of the text object 503, based on the geometric form 501. For example, in accordance with the acquired 3D-related information of the geometric form 501, the processor 120 may change corresponding 3D-related information of the text object 503.

Figure 5D:
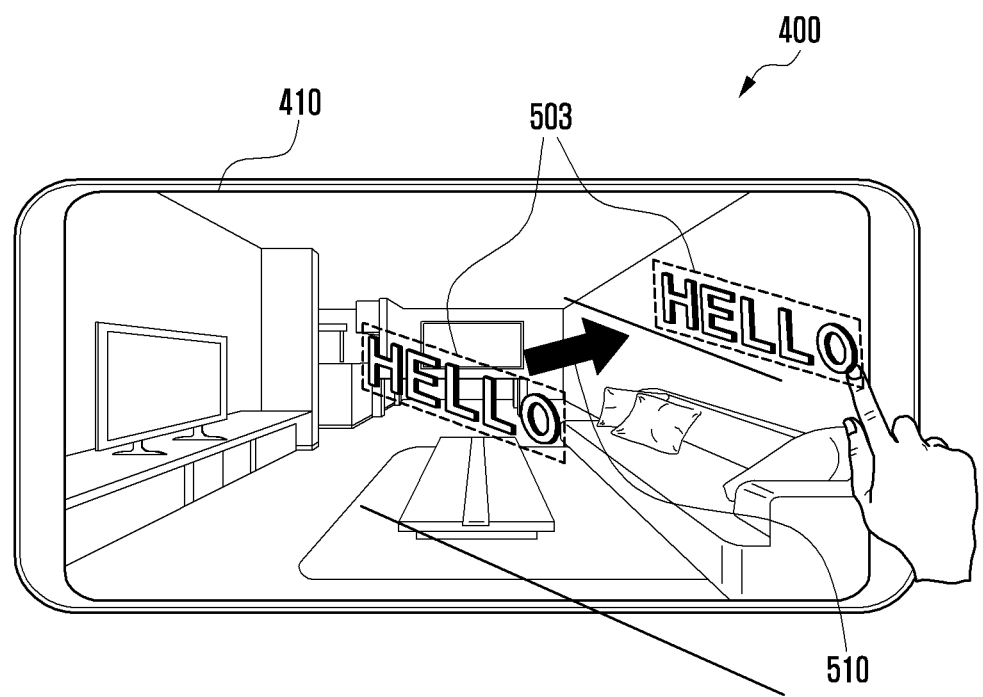

Referring to FIG. 5D, the processor 120 may receive a third user input 510 associated with the text object 503. For example, the third user input may be a drag input for moving the text object 503 in the 3D-based user interface. Thus, the processor 120 may move the text object 503 in response to the third user input 510. At this time, the geometric form 501 may disappear from the display 410.

Figure 5E:
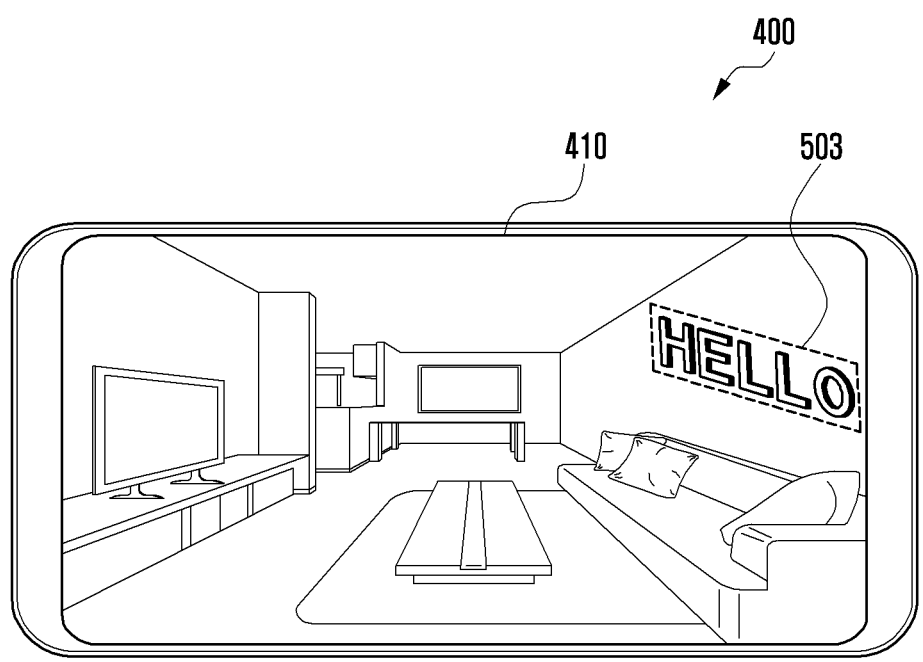

Referring to FIG. 5E, the processor 120 may display the moved text object 503 on the display 410 after the third user input 510 is released. As a result, the moved text object 503 may act as one of things contained in the 3D-based user interface.

Figure 6:
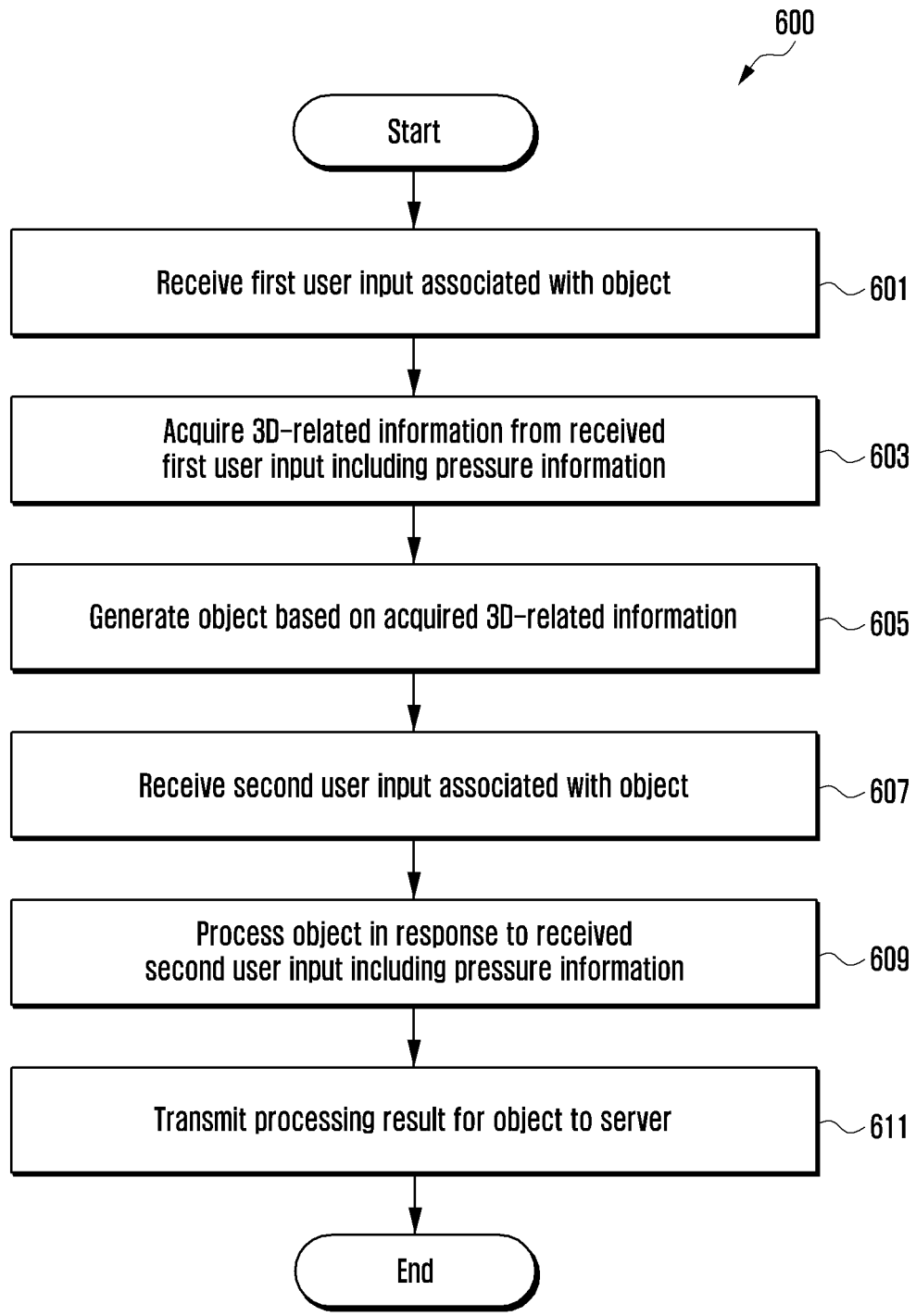
FIG. 6 is a flowchart of a method for generating a 3D object by using pressure information according to an embodiment.

FIG. 6 is a flowchart 600 of a method for generating a 3D object by using pressure information according to an embodiment.

At step 601, a processor 120 of an electronic device 101 may receive a first user input associated with an object. The first user input may be a touch input and include pressure information associated with the touch input. The processor 120 may display a user interface (e.g., an AR interface) to be used for generating the object through a display such as a touch screen display and receive the first user input through the user interface.

At step 603, the processor 120 may acquire 3D-related information from the received first user input including the pressure information. For example, the 3D-related information may include data on coordinates, angle, slope, width, length, height, and/or area for generating the object such as text or a geometric form.

At step 605, the processor 120 may generate the object, based on the acquired 3D-related information. In addition, the processor 120 may display the generated object on the display 160 and also store the generated object in a memory 130.

At step 607, the processor 120 may receive a second user input associated with the object. The second user input may be a touch input and include pressure information associated with the touch input. For example, the second user input may be an input for moving or rotating the generated object in the user interface or for modifying the shape of the generated object.

At step 609, the processor 120 may process the object in response to the received second user input including the pressure information. For example, the processor 120 may rotate the object displayed on the display 160 in accordance with the second user input including the pressure information. In an embodiment, a touch position of the second user input may determine a rotation axis of the object, and the pressure information may determine a rotation angle of the object. That is, as a pressure input is increased, the rotation angle may be increased.

At step 611, the processor 120 may transmit a processing result for the object to the server 108. For example, the processor 120 may store information about the rotated object in the memory 130 and transmit such information to an external electronic device (e.g., the server 108).

Figure 7A:
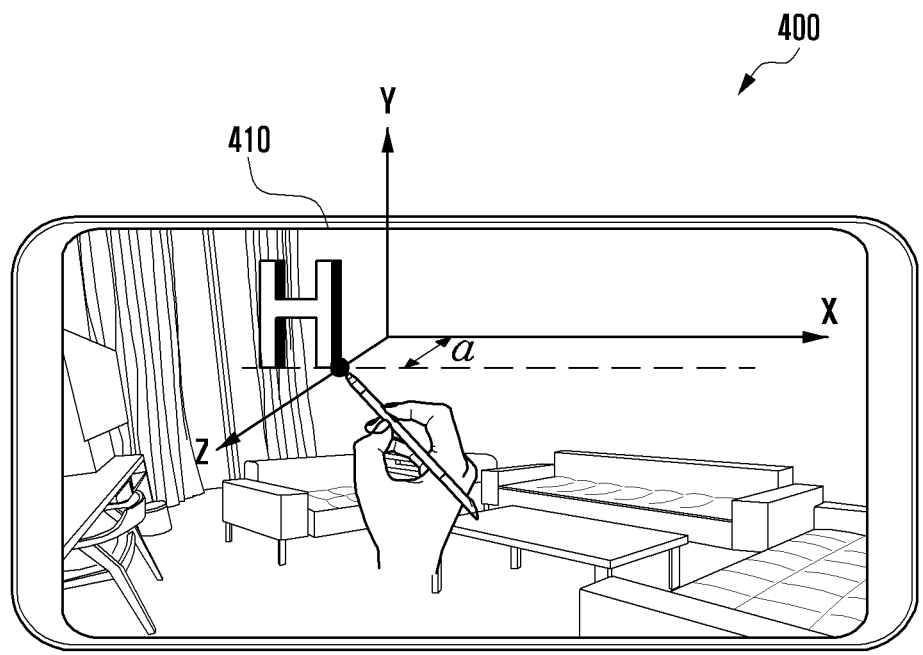
FIGS. 7A, 7B, and 7C are illustrations of generating a 3D object by using pressure information according to an embodiment.
Figure 7A:
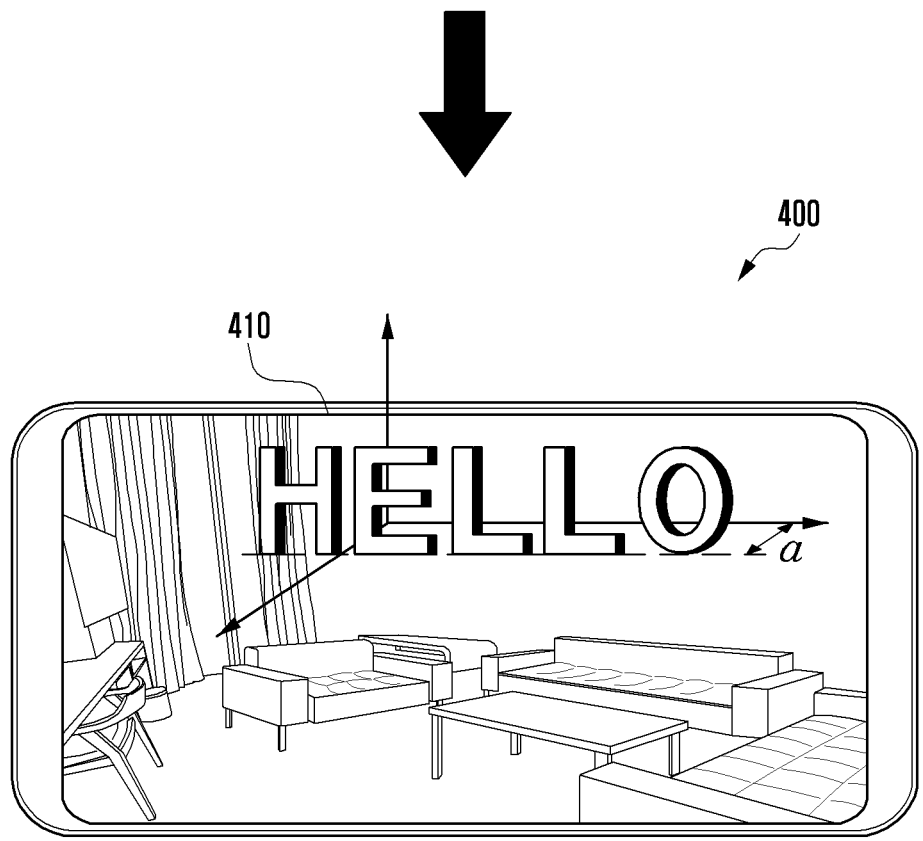
Figure 7B:
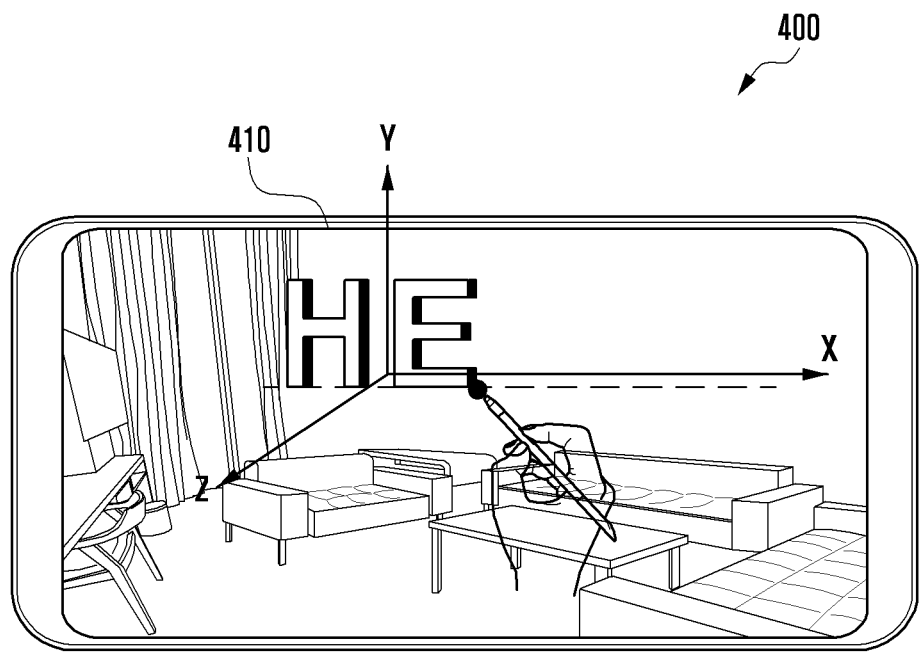
Figure 7B:
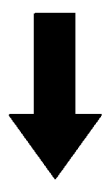
Figure 7B:
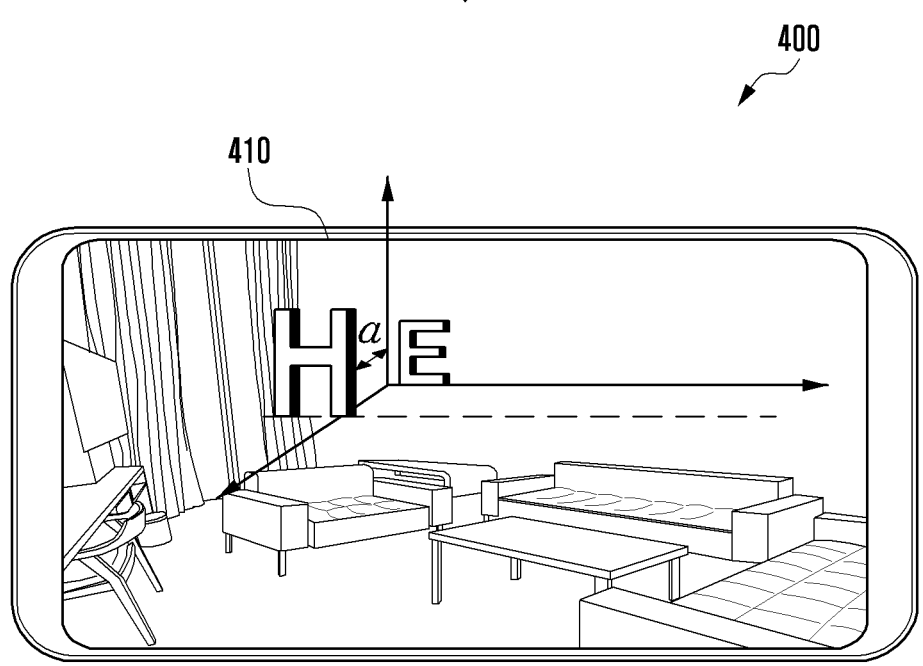
Figure 7C:
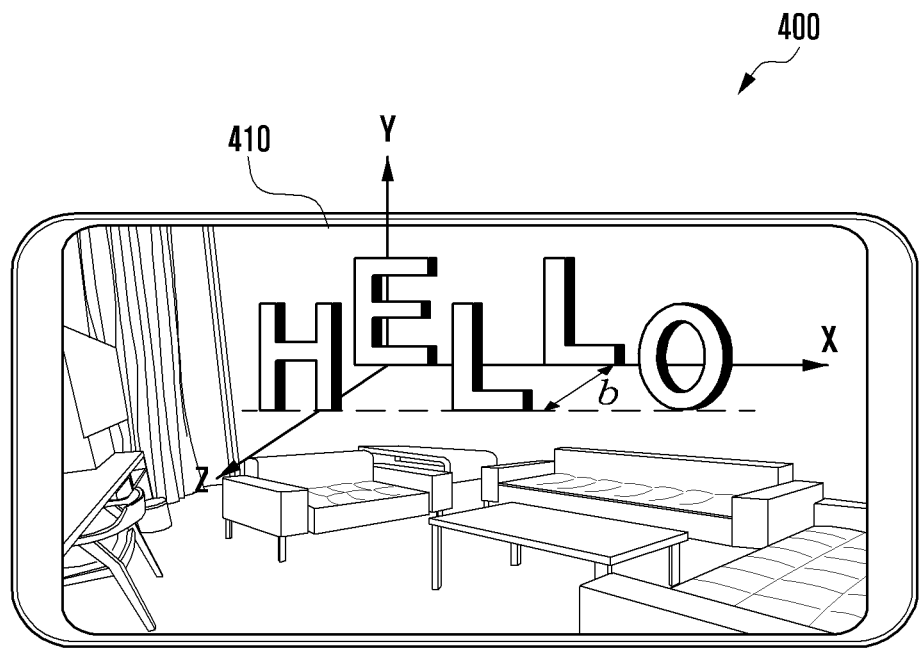
Figure 7C:
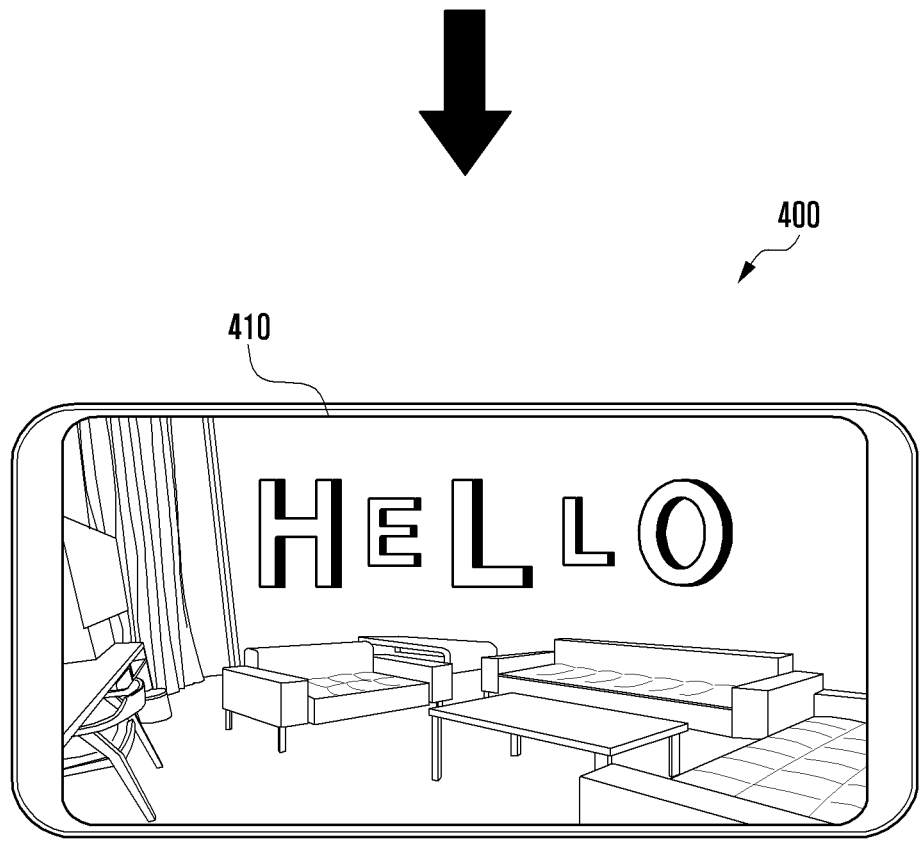

FIGS. 7A, 7B, and 7C are illustrations of generating a 3D object by using pressure information according to an embodiment.

Referring to FIG. 7A, a processor 120 of an electronic device 400 may receive a user input associated with an object. This user input may be a touch input and include pressure information associated with the touch input. Therefore, upon receiving the user input, the processor 120 may extract the pressure information from the received user input.

For example, when it is assumed that the user input has the pressure information within 120 pressure units, the processor 120 may define in advance a pressure level according to the range of pressure units as shown in Table 1 below. Table 1 below shows an example where four pressure levels are defined. In this example, the processor 120 may detect a certain pressure unit of the received user input by extracting the pressure information and find a certain pressure level corresponding to the detected pressure unit by referring to Table 1 below.

TABLE 1

| Pressure Level | Pressure Range |
|---|---|
| 1 | 0 < pressure unit ≤ 30 |
| 2 | 30 < pressure unit ≤ 60 |
| 3 | 60 < pressure unit ≤ 90 |
| 4 | 90 < pressure unit ≤ 120 |

After finding the pressure level associated with the user input, the processor 120 may determine, based on the pressure level, Z-axis coordinate information (i.e., depth information) of an object to be generated. For example, the processor 120 may establish a virtual coordinate system composed of X, Y and Z-axes in a user interface (e.g., an AR interface) displayed on a display 410. When the received user input for generating an object (e.g., a text object "HELLO") is a touch input having a certain pressure level, the processor 120 may determine an X-axis coordinate and a Y-axis coordinate from the position of the touch input and also determine a Z-axis coordinate from the pressure level. For example, in case of a pressure level of "1", the processor 120 may generate and display the object to have a Z-axis coordinate "a" as shown in FIG. 7A.

Referring to FIG. 7B, the user input for generating the text object "HELLO" may have different pressure levels for respective letters of "HELLO". For example, when a letter "H" is inputted with a pressure level of "1" and then a letter "E" is inputted with a pressure level of "2", the processor 120 may generate and display the letter "H" to have a Z-axis coordinate "a" and also generate and display the letter "E" to have a Z-axis coordinate "0".

Similarly, referring to FIG. 7C, when letters "H", "L" and "O" are inputted with a pressure level of "1" and also letters "E" and "L" are inputted with a pressure level of "2", the processor 120 may generate and display the letters "H", "L" and "O" to have a Z-axis coordinate "b" and also generate and display the letters "E" and "L" to have a Z-axis coordinate "0".

As described herein, the object generated in response to a user input having a certain pressure level may have a depth determined according to the pressure level when displayed in the user interface.

Figure 8:
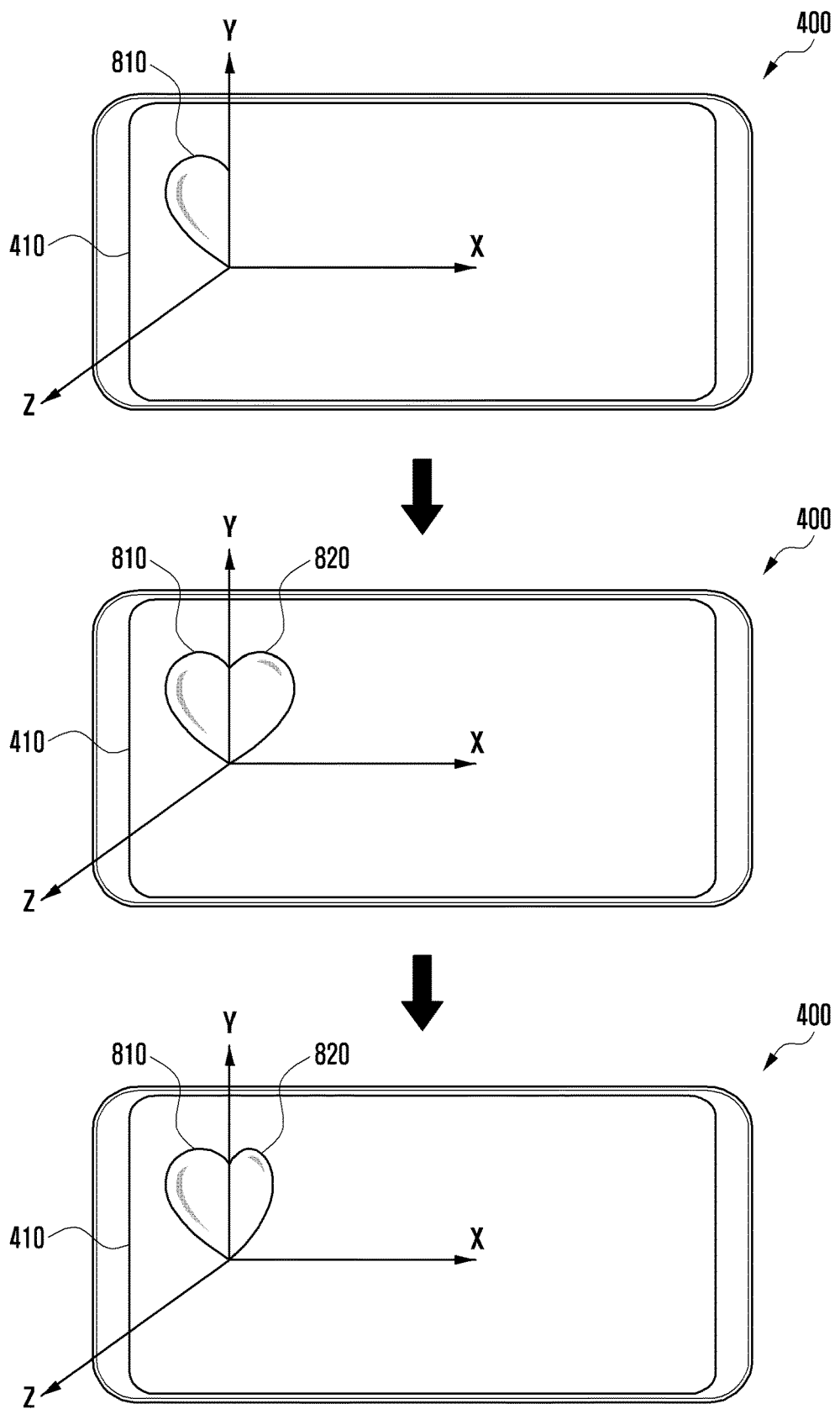
FIG. 8 is an illustration of generating a 3D object by using pressure information according to an embodiment.

FIG. 8 is an illustration of generating a 3D object by using pressure information according to an embodiment.

Referring to FIG. 8, a processor 120 of an electronic device 400 may receive a user input associated with an object. This user input may be a touch input and include pressure information associated with the touch input. Therefore, upon receiving the user input, the processor 120 may extract the pressure information from the received user input.

For example, when it is assumed that the received user input is an input for constructing a heart form, an input of drawing a left portion 810 of the heart form and an input of drawing a right portion 820 of the heart form may have different pressure levels. In this case, the processor 120 may calculate a difference in pressure level between both inputs and, based on the calculated difference, determine a rotation angle of the heart form. A related example is shown in Table 2 below.

TABLE 2

| Difference in Pressure Level | Rotation Angle |
|---|---|
| 0 | 0° |
| 1 | 30° |
| 2 | 60° |
| 3 | 90° |

For example, when the input for the left portion 810 may have a pressure level of "1", and when the input for the right portion 820 may have a pressure level of "2", a difference in pressure level becomes "1". Therefore, the processor 120 may determine the rotation angle as 30° by referring to Table 2 above. Then, the processor 120 may rotate one portion of the heart form having the greater pressure level by the determined rotation angle. That is, the right portion 820 of the heart form having the greater pressure level is rotated by 30°.

As described herein, the object generated in response to user inputs having different pressure levels may be partially rotated according to a difference in the pressure level when displayed in the user interface.

Figure 9:
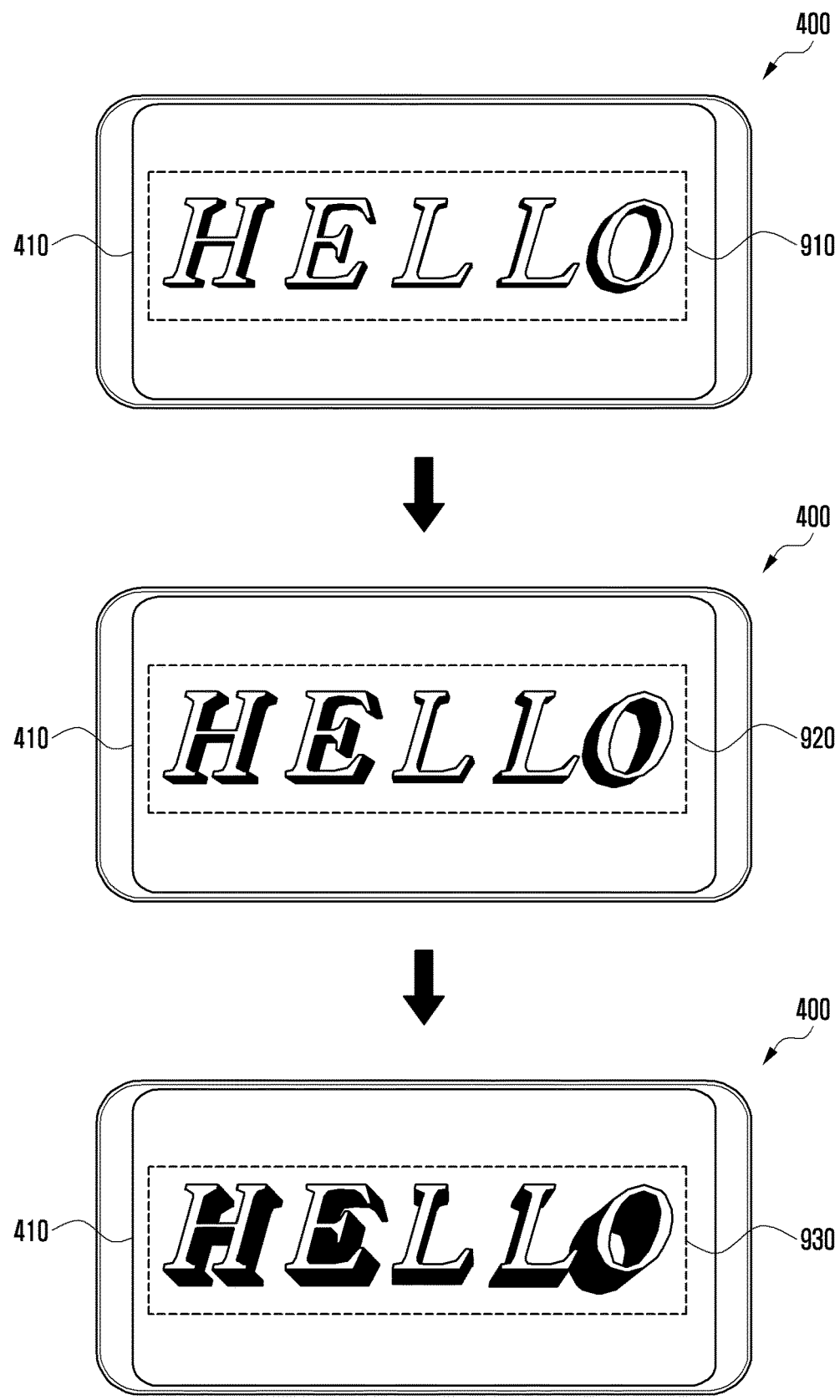
FIG. 9 is an illustration of generating a 3D object by using pressure information according to an embodiment.

FIG. 9 is an illustration of generating a 3D object by using pressure information according to an embodiment.

Referring to FIG. 9, a processor 120 of an electronic device 400 may receive a user input for generating a text object "HELLO", generate the text object "HELLO" in response to the received user input, and display the generated text object on a display 410. In this case, the depth of the text object may vary according to pressure information of the received user input.

In three examples of FIG. 9, a first exemplary text object 910 may have a lower depth according to a pressure level of "1". On the other hand, a second exemplary text object 920 may have a middle depth according to a pressure level of "2", and a third exemplary text object 930 may have a higher depth according to a pressure level of "3".

FIGS. 10A, 10B, 10C, and 10D are illustrations of rotating a 3D object in response to an additional user input according to an embodiment.

Figure 10A:
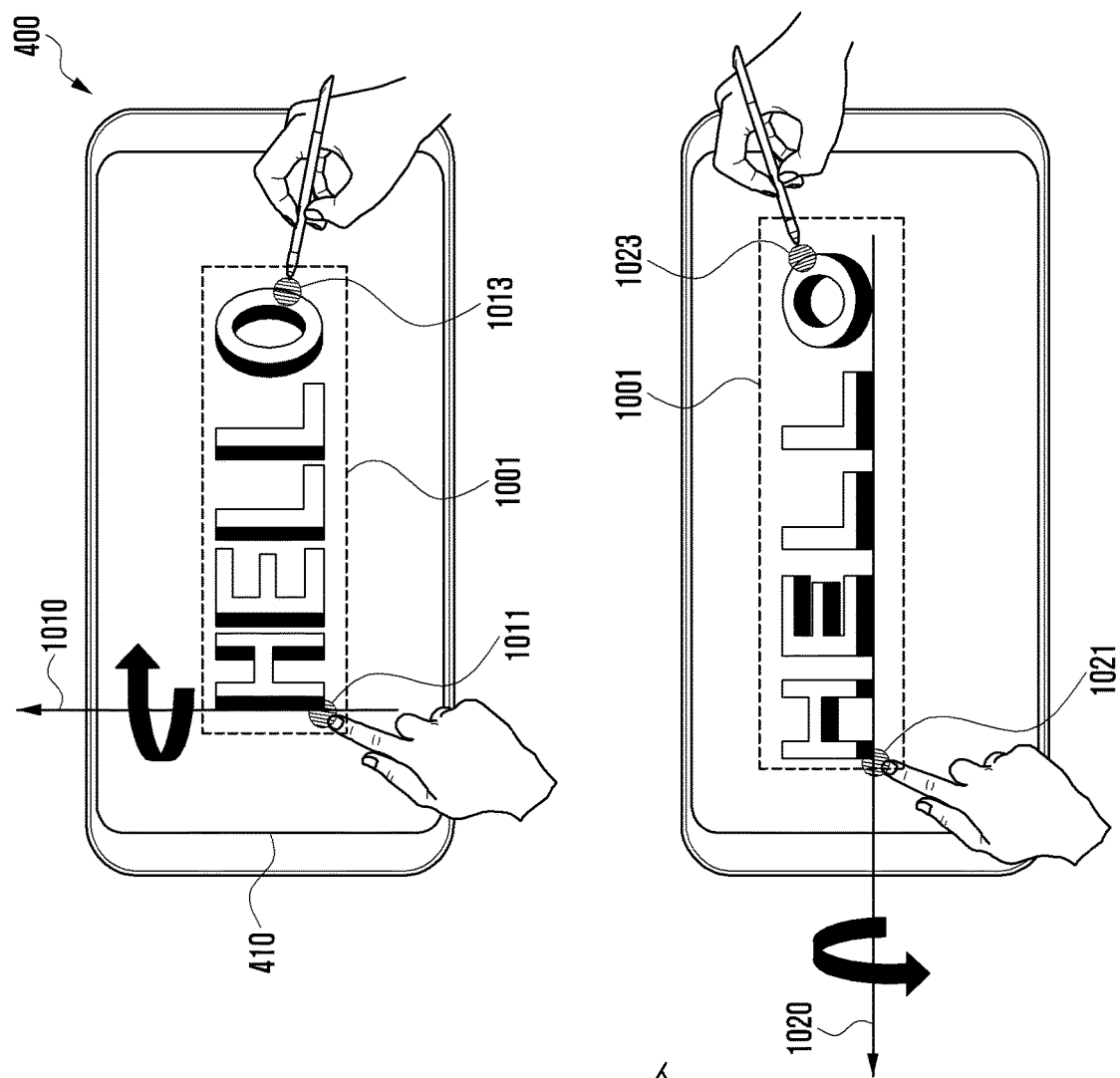
FIGS. 10A, 10B, 10C, and 10D are illustrations of rotating a 3D object in response to an additional user input according to an embodiment.
Figure 10A:
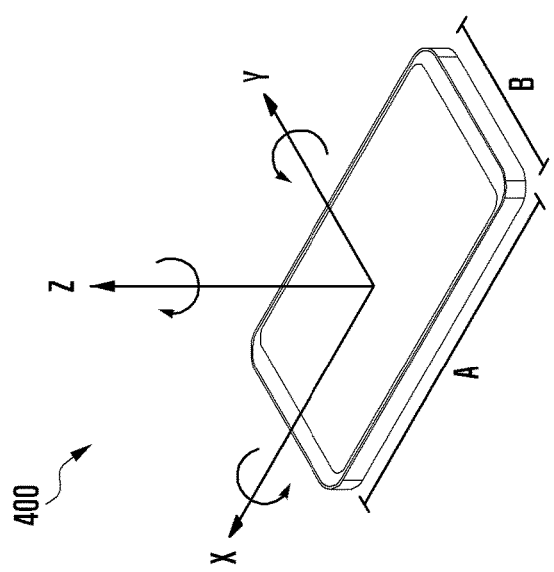

Referring to FIG. 10A, a processor 120 of an electronic device 400 may establish a virtual coordinate system composed of X, Y and Z-axes in a user interface (e.g., an AR interface) displayed on a display 410. For example, the X-axis may be set to correspond to the length A of the electronic device 400, and the Y-axis may be set to correspond to the width B of the electronic device 400. In addition, the Z-axis may be set to correspond to a vertical direction from the display 410. According to an embodiment, the processor 120 may display an object on the display 410. Then, the processor 120 may receive a user input for the displayed object and rotate the object at least in part in response to the received user input.

The processor 120 may display a text object 1001 (e.g., "HELLO") on the display 410. Then, the processor 120 may receive a multi-touch input including a first user input 1011 and a second user input 1013 with respect to the text object 1001. For example, the first user input 1011 may be a finger touch input, and the second user input 1013 may be a pen touch input.

In an embodiment, the processor 120 may determine a rotation axis of the object, based on the first user input 1011, and also determine a rotation direction of the object, based on the second user input 1013. For example, when the first user input 1011 is detected from the left end (i.e., a letter "H") of the object "HELLO", and when the second user input 1013 is detected from the right end (i.e., a letter "O") of the object, the processor 120 may determine the rotation axis of the object as the Y-axis 1010 passing the left end of the object, based on the first user input 1011, and also determine the rotation direction of the object as the rightward direction on the rotation axis, based on the second user input 1013. Here, a rotation angle may be determined in proportion to time duration of the second user input 1013 or a pressure level of the second user input 1013.

In an embodiment, when a first user input 1021 is detected from the lower end of the text object 1001 "HELLO", and when a second user input 1023 is detected from the upper end of the object, the processor 120 may determine the rotation axis of the object as the X-axis 1020 passing the lower end of the object, based on the first user input 1021, and also determine the rotation direction of the object as the downward direction on the rotation axis, based on the second user input 1023. Here, a rotation angle may be determined in proportion to time duration of the second user input 1023 or a pressure level of the second user input 1023.

Figure 10B:
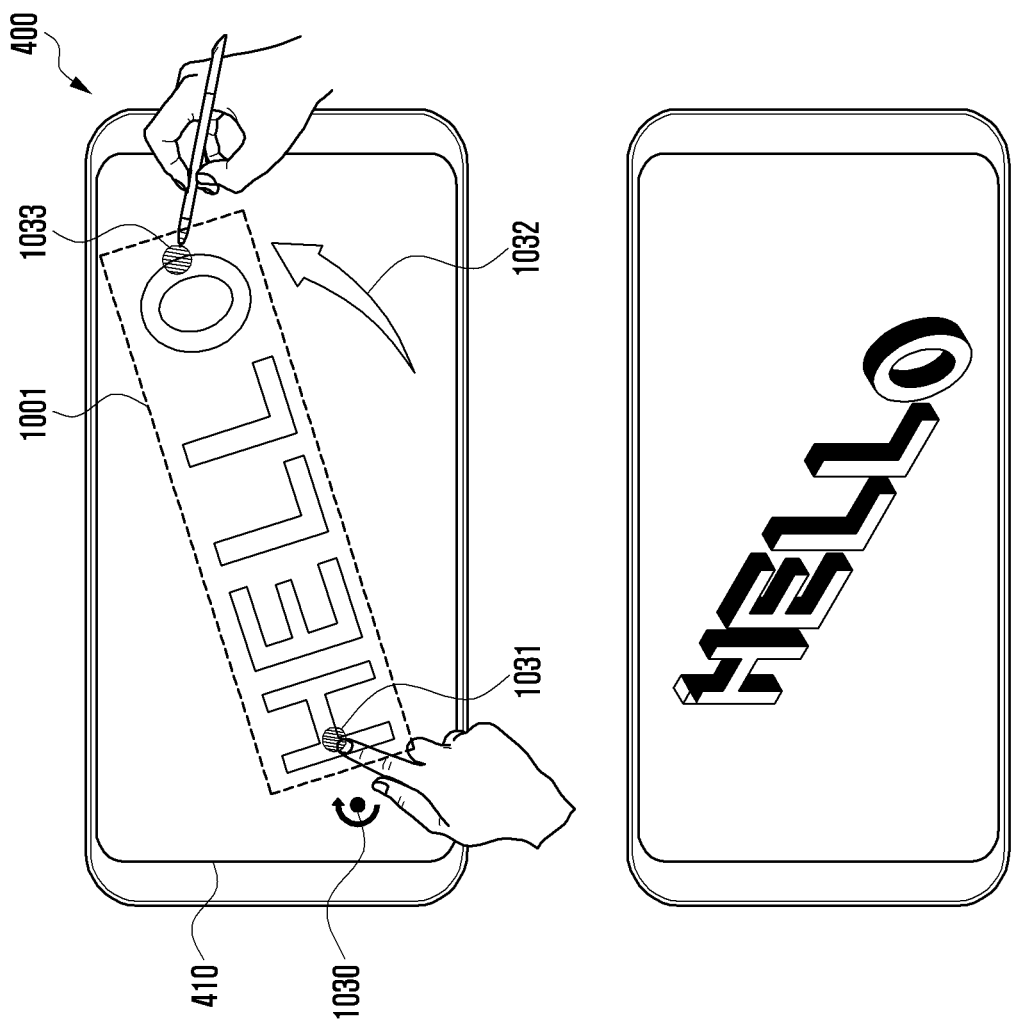
Figure 10B:
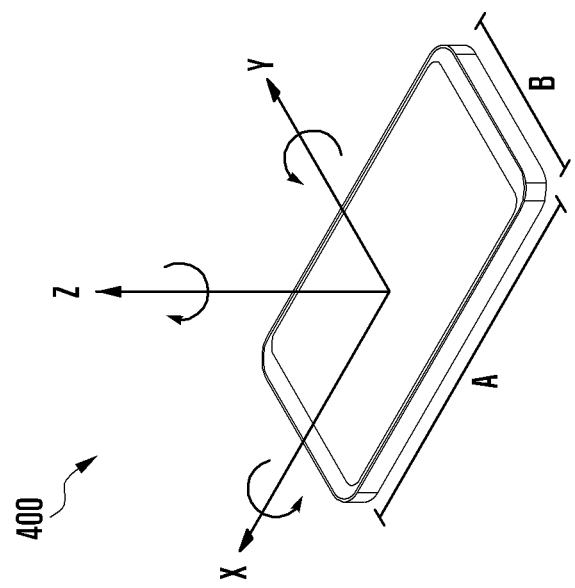

Referring to FIG. 10B, the processor 120 may receive a multi-touch input including a first user input 1031 such as a finger touch input and a second user input 1033 such as a pen drag input. Then, the processor 120 may determine a rotation axis of the object, based on the first user input 1031, and also determine a rotation direction of the object, based on the second user input 1033.

For example, when the first user input 1031 is detected from the left end (i.e., a letter "H") of the object "HELLO", and when the second user input 1033 is detected from the right end (i.e., a letter "O") of the object, the processor 120 may determine the rotation axis of the object as the Z-axis 1030 near the left end of the object, based on the first user input 1031, and also determine the rotation direction 1032 of the object according to the second user input 1033 (i.e., a dragging direction).

Figure 10C:
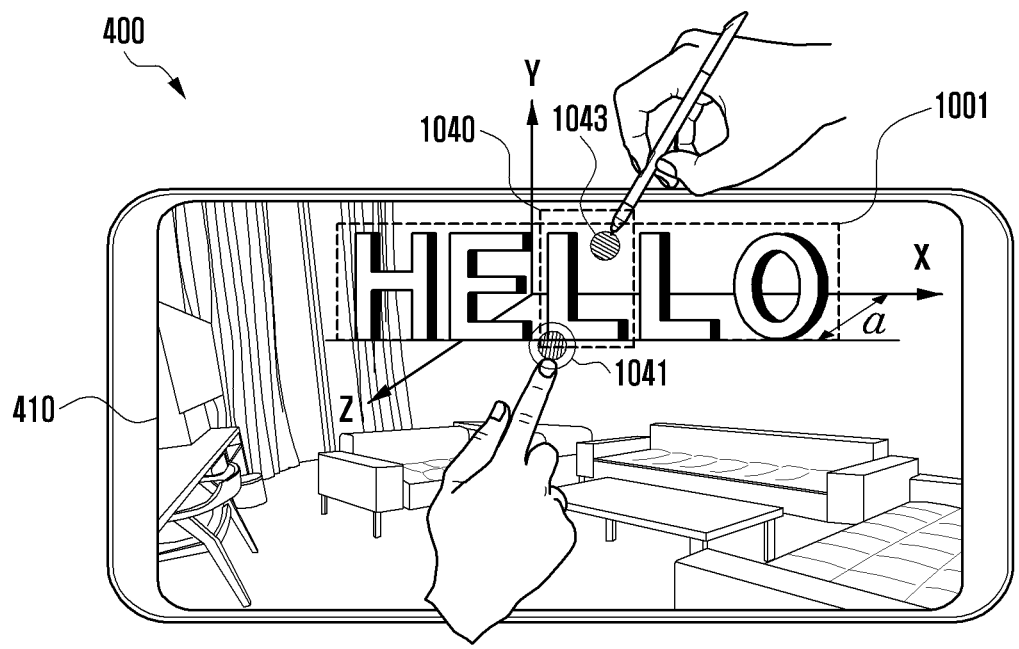
Figure 10C:
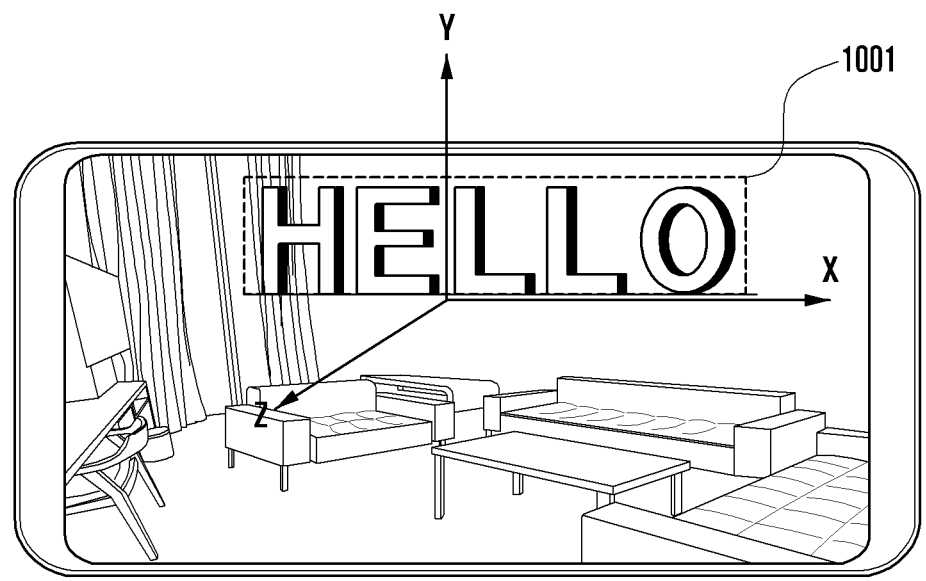

Referring to FIG. 10C, the processor 120 may receive a multi-touch input including a first user input 1041 such as a finger touch input and a second user input 1043 such as a pen touch input with respect to a predetermined single region 1040 in the object 1001. In this case, the processor 120 may linearly move the displayed object 1001 in response to the received multi-touch input.

For example, when the first and second user inputs 1041 and 1043 are detected from the same region 1040 (i.e., a middle letter "L") of the object 1001 "HELLO", the processor 120 may linearly move the object 1001 along the Z-axis, that is, adjust the depth of the object. Here, a moving distance or adjusted depth of the object may be determined in proportion to time duration of both the first and second user inputs 1041 and 1043 or a pressure level of at least one of the first and second user inputs 1041 and 1043.

Figure 10D:
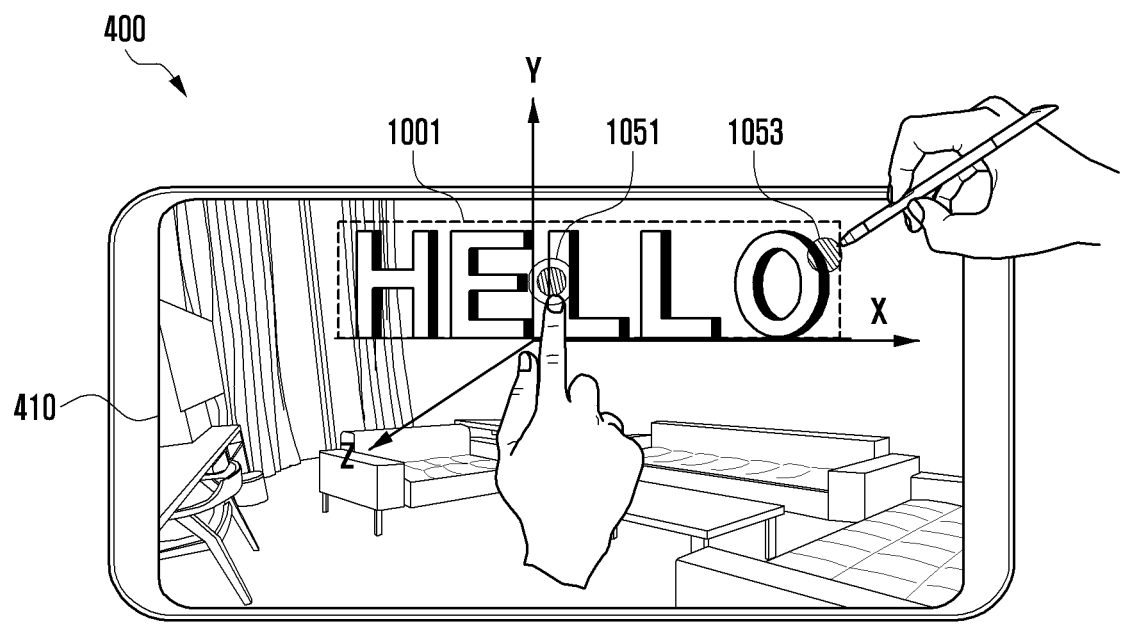
Figure 10D:
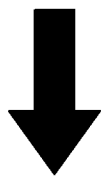
Figure 10D:
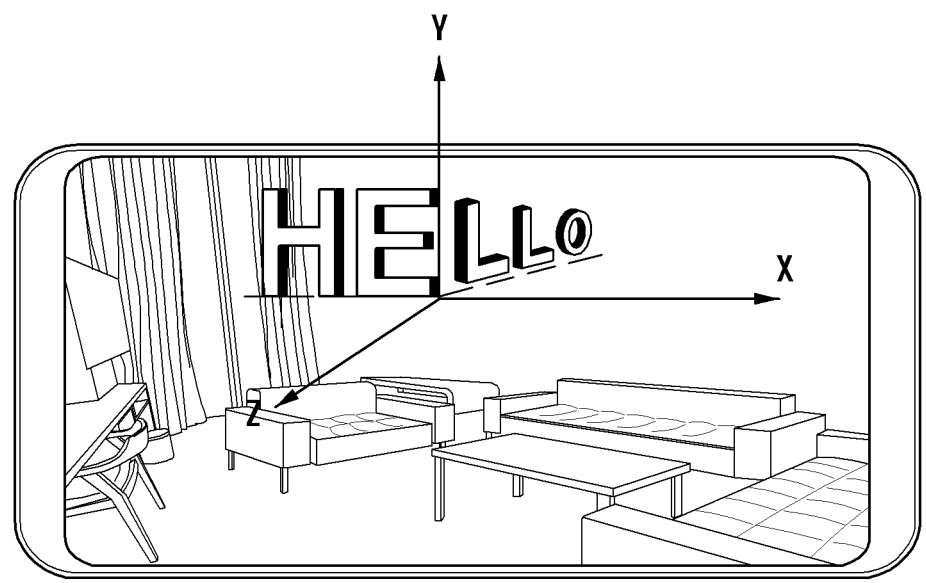

Referring to FIG. 10D, the processor 120 may receive a multi-touch input including a first user input 1051 such as a finger touch input and a second user input 1053 such as a pen touch input. Then, the processor 120 may determine a rotation axis of the object 1001, based on the first user input 1051, and also determine a rotation direction of the object, based on the second user input 1053.

For example, when the first user input 1051 is detected from a certain inside point (e.g., a space between letters "E" and "L") of the object 1001 "HELLO", and when the second user input 1053 is detected from the right end (i.e., a letter "O") of the object, the processor 120 may determine the rotation axis of the object as the Y-axis 1030 passing the inside point of the object, based on the first user input 1051, and also determine the rotation direction of the object as the rightward direction on the rotation axis, based on the second user input 1053. Here, a rotation angle may be determined in proportion to time duration of the second user input 1053 or a pressure level of the second user input 1053.

Figure 11:
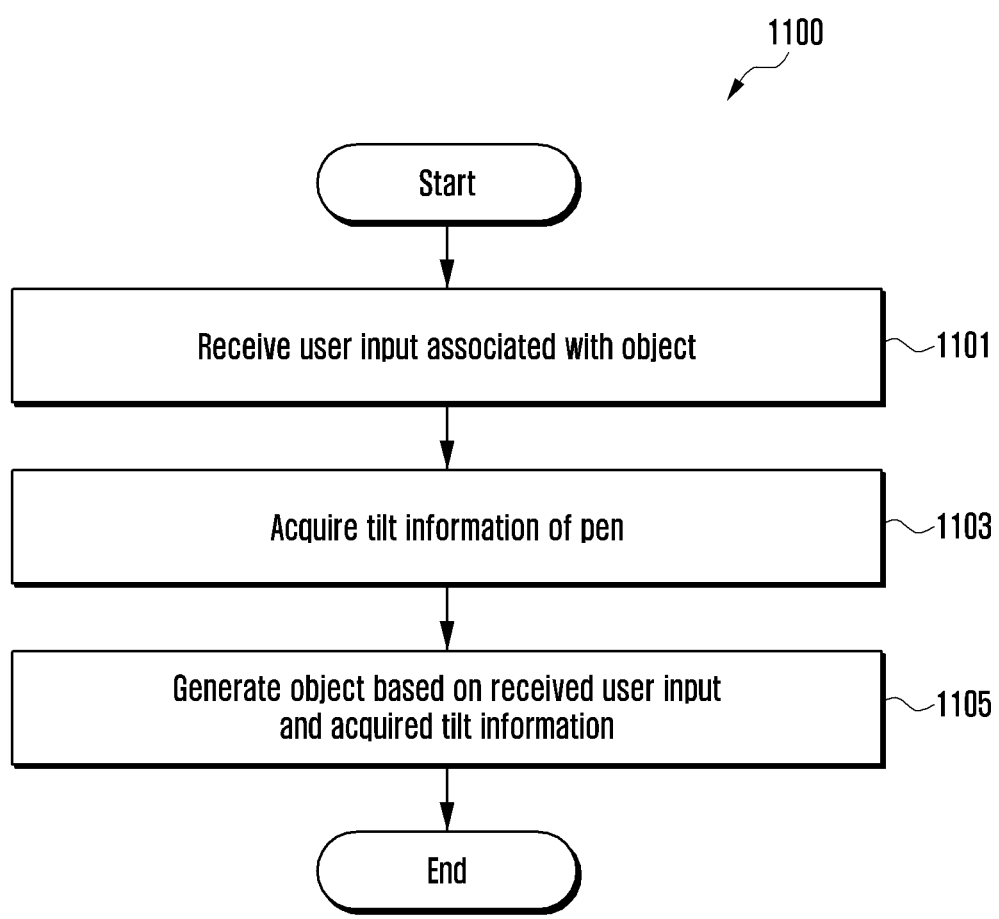
FIG. 11 is a flowchart of a method for generating a 3D object by using pen tilt information according to an embodiment.

FIG. 11 is a flowchart 1100 of a method for generating a 3D object by using pen tilt information according to an embodiment.

At step 1101, a processor 120 of an electronic device 101 may receive a user input associated with an object. The user input may be a touch input by a stylus pen.

At step 1103, the processor 120 may acquire tilt information of the pen. For example, the processor 120 may detect the tilt information of the pen, based on electromagnetic waves that change according to a tilt of the pen. For example, the pen may have a sensor for detecting the tilt information thereof and acquire the tilt information through the sensor. Therefore, the processor 120 may receive the tilt information of the pen from the pen.

At step 1105, the processor 120 may generate an object, based on both the received user input and the acquired tilt information of the pen. For example, the processor 120 may determine a direction and slope of the object, based on the tilt information of the pen. Then, the processor 120 may display, on a display, the object to which the determined direction and slope are applied.

Figure 12A:
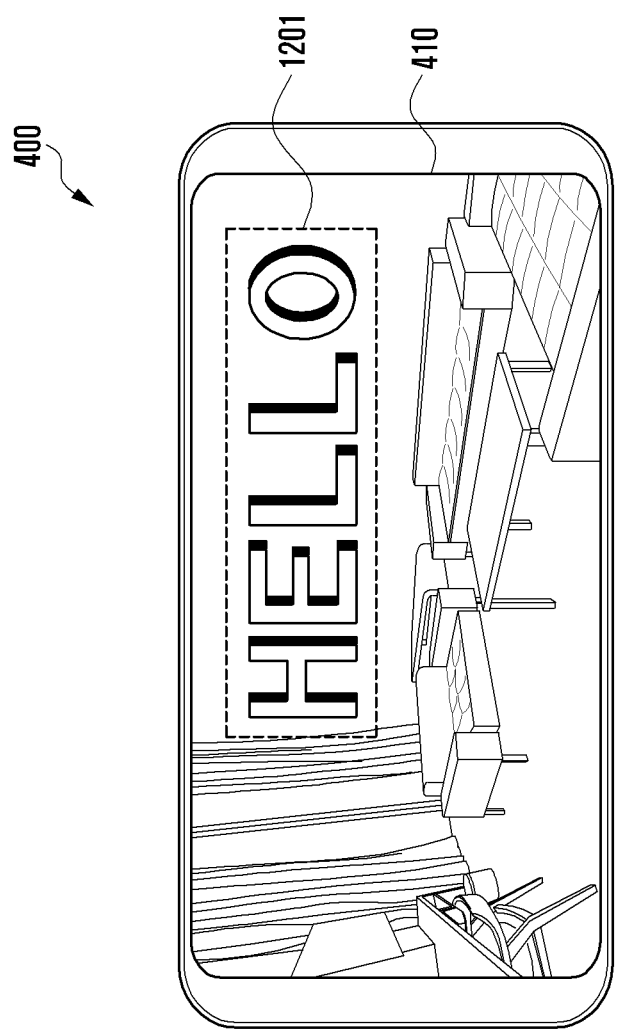
FIGS. 12A, 12B, and 12C are illustrations of generating a 3D object by using pen tilt information according to an embodiment.
Figure 12A:
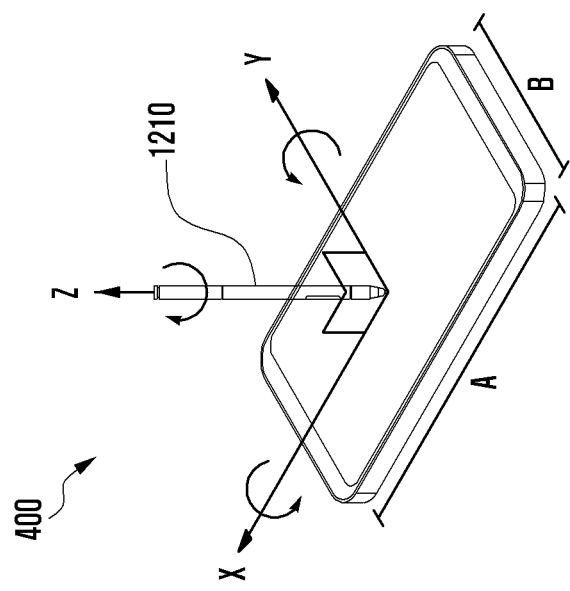
Figure 12B:
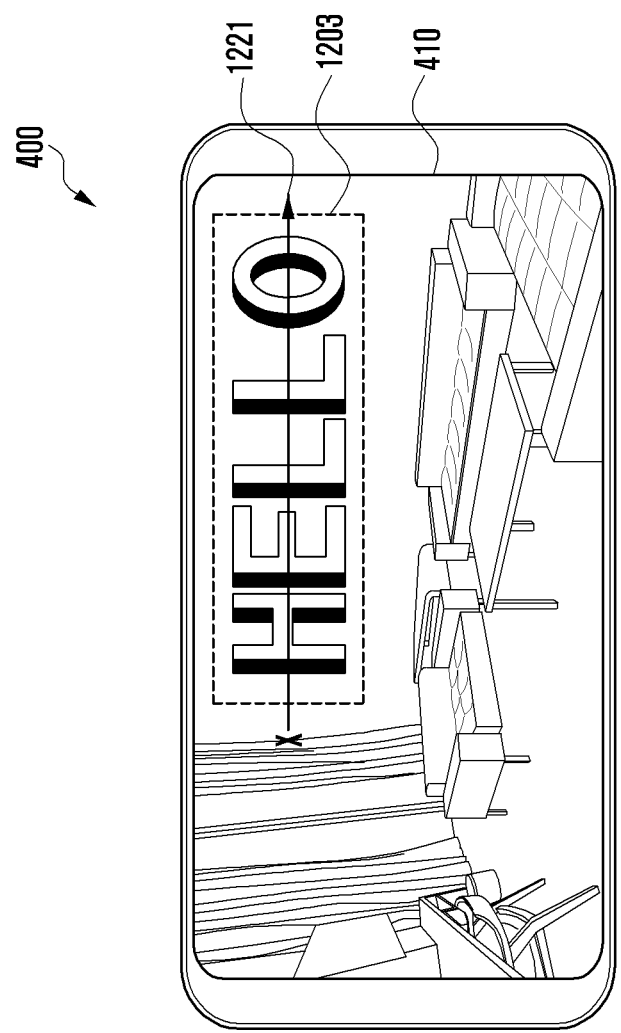
Figure 12B:
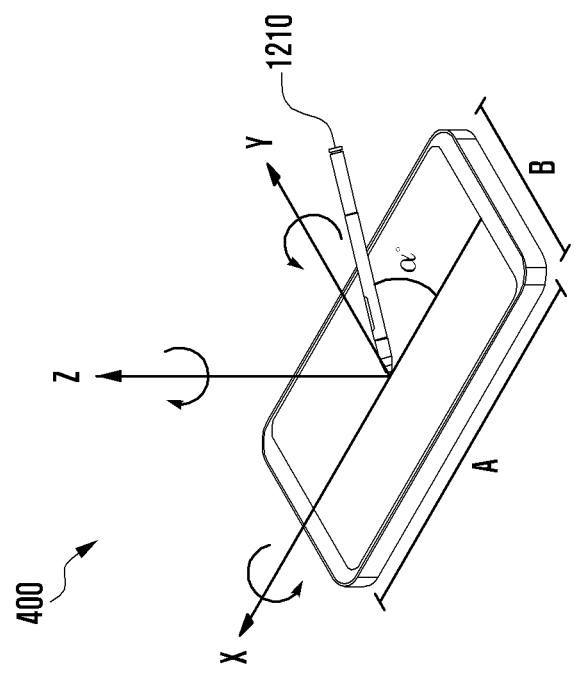
Figure 12C:
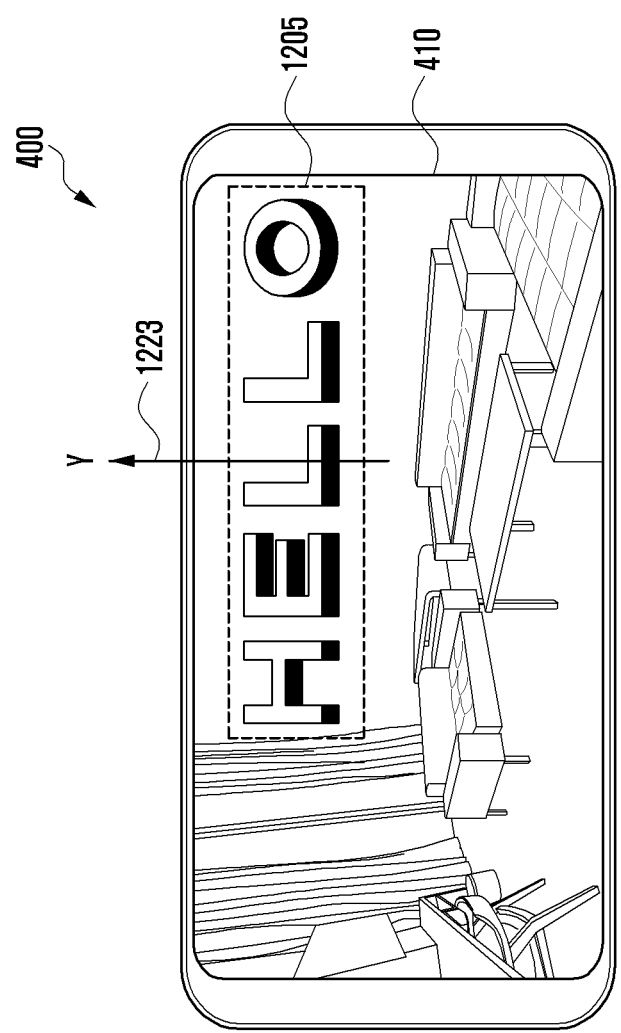
Figure 12C:
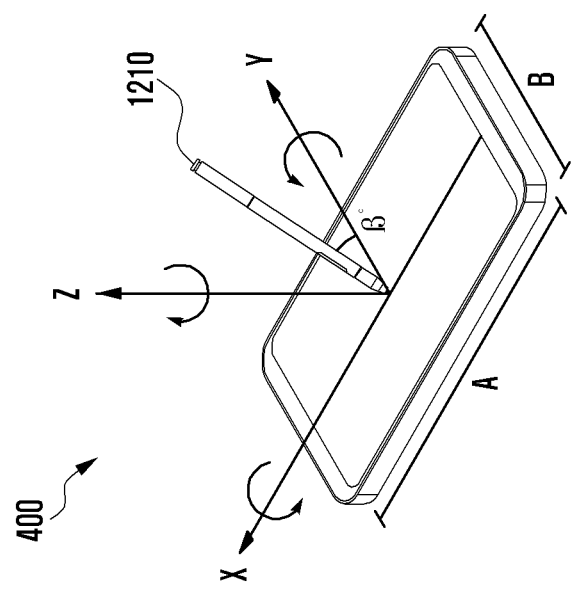

FIGS. 12A, 12B, and 12C are illustrations of generating a 3D object by using pen tilt information according to an embodiment.

Referring to FIG. 12A, a processor 120 of an electronic device 400 may establish a virtual coordinate system composed of X, Y and Z-axes in a user interface (e.g., an AR interface) displayed on a display 410. For example, the X-axis may be set to correspond to the length A of the electronic device 400, and the Y-axis may be set to correspond to the width B of the electronic device 400. In addition, the Z-axis may be set to correspond to a vertical direction from the display 410.

According to an embodiment, the processor 120 may display an object 1201 (e.g., a text object "HELLO") on the display 410. Then, the processor 120 may receive a user input by a pen 1210 for the displayed object 1201, acquire tilt information of the pen 1210, and modify the object on the basis of the acquired tilt information.

When the tilt information indicates that the pen 1210 has a tilt of 0° from the Z-axis (that is, the pen is vertical to the display 410), the processor 120 may display the object 1201 without any tilt.

Referring to FIG. 12B, when the tilt information indicates that the pen 1210 has a tilt of α° from the X-axis 1221, the processor 120 may display a text object 1203 "HELLO" to have a tilt of α° from the X-axis 1221.

Referring to FIG. 12C, when the tilt information indicates that the pen 1210 has a tilt of β° from the Y-axis 1223, the processor 120 may display a text object 1205 "HELLO" to have a tilt of β° from the Y-axis 1223.

According to various embodiments, an electronic device includes a housing; a touch screen display disposed within the housing and exposed through at least a portion of the housing; a camera; a wireless communication circuit disposed within the housing; a position sensor; a motion sensor; a processor disposed within the housing and operatively connected to the display, the camera, the wireless communication circuit, the position sensor, and the motion sensor; and a memory disposed within the housing and operatively connected to the processor. The memory may store instructions causing, upon execution, the processor to capture an image by using the camera, to receive the captured image from the camera, to receive position data associated with the captured image from the position sensor, to receive orientation data associated with the captured image from the motion sensor, to receive a user input for adding an object to the captured image through the display, and to transmit the object, the captured image, the position data, and the orientation data to an external server through the wireless communication circuit.

The processor may receive the user input using a stylus pen.

The object may include at least one of text, a symbol, a geometric form, or an image.

The processor may receive a first user input of constructing a geometric form on the captured image, and receive a second user input of writing text at least partially overlapped with the geometric form on the captured image.

The processor may change a direction of the text in accordance with the geometric form, and transmit information about the changed direction to the server.

The processor may receive a third user input of moving the text in the captured image, and display the moved text on the display without displaying the geometric form.

The processor may identify three-dimensional (3D)-related information corresponding to the geometric form, and change the direction of the text, based on the identified 3D-related information.

The 3D-related information may include data on at least one of coordinates, angle, slope, width, length, height, or area, which corresponds to the geometric form.

The processor may receive a multi-touch input, and rotate the object at least in part, based on the received multi-touch input.

The multi-touch input may include a first touch input for determining a rotation axis of the object, and a second touch input for determining a rotation direction of the object.

The processor may receive tilt information of the stylus pen from the stylus pen, and rotate the object at least in part, based on the received tilt information.

The electronic device may further include a pressure sensor, and the processor may receive pressure information associated with the user input from the pressure sensor, and generate the object, based on the received pressure information.

The processor may generate the object in accordance with the received user input, and store the generated object in the memory.

According to various embodiments, a system includes a network interface; a processor operatively connected to the network interface; and a memory operatively connected to the processor. The memory may store instructions causing, upon execution, the processor to receive first data from a first external electronic device including a display and a camera via the network interface, wherein the first data includes an image, position data associated with the image, orientation data associated with the image, and an object generated in response to a user input to be overlapped with the image, to process the first data such that a direction of the object is applied on the image, based on, at least in part, the position data, the orientation data, or the user input received from the first external electronic device, and to transmit the processed first data to another external electronic device via the network interface.

The processor may receive an image, position data associated with the image, and orientation data associated with the image from a second external electronic device including a display and a camera via the network interface, and transmit the object to the second external electronic device via the network interface such that the object is displayed on the display of the second external electronic device, wherein the orientation data is applied to the displayed object.

The electronic device may be one of various types of electronic devices. The electronic devices may include, for example, a portable communication device (e.g., a smart phone), a computer device, a portable multimedia device, a portable medical device, a camera, a wearable device, or a home appliance. However, the electronic devices are not limited to those described above.

It should be appreciated that the present disclosure is not intended to be limited by the various embodiments described above or the terms used therein but includes various changes, equivalents, or replacements. With regard to the description of the accompanying drawings, similar reference numerals may be used to refer to similar or related elements. It is to be understood that a singular form of a noun corresponding to an item may include one or more of the item, unless the relevant context clearly indicates otherwise. As used herein, phrases such as "A or B", "at least one of A and B", "at least one of A or B", "A, B, or C", "at least one of A, B, and C", and "at least one of A, B, or C" may include all possible combinations of the items enumerated together in a corresponding one of the phrases. As used herein, such terms as "1st", "2nd", "first", and "second" may be used to simply distinguish a corresponding component from another component, but is not intended to limit the components in another aspect (e.g., importance or order). It is to be understood that if an element (e.g., a first element) is referred to, with or without the term "operatively" or "communicatively", as "coupled with", "coupled to", "connected with", or "connected to" another element (e.g., a second element), it indicates that the element may be coupled with the other element directly (e.g., wired), wirelessly, or via a third element.

As used herein, the term "module" may include a unit implemented in hardware, software, or firmware, and may be interchangeably used with other terms, for example, "logic", "logic block", "part", and "circuitry". The term "module" may indicate a single integral component, or a minimum unit or part thereof, adapted to perform one or more functions. For example, according to an embodiment, the term "module" may be implemented in a form of an application-specific integrated circuit (ASIC).

Various embodiments as set forth herein may be implemented as software (e.g., the program 140) including one or more instructions that are stored in a storage medium (e.g., internal memory 136 or external memory 138) that is readable by a machine (e.g., the electronic device 101). For example, a processor (e.g., the processor 120) of the machine may invoke at least one of the one or more instructions stored in the storage medium, and execute it, with or without using one or more other components under the control of the processor. This allows the machine to be operated to perform at least one function according to the at least one instruction invoked. The one or more instructions may include a code generated by a complier or a code executable by an interpreter. The machine-readable storage medium may be provided in the form of a non-transitory storage medium. Wherein, the term "non-transitory" simply indicates that the storage medium is a tangible device, and does not include a signal (e.g., an electromagnetic wave), but this term does not differentiate between where data is semi-permanently stored in the storage medium and where the data is temporarily stored in the storage medium.

A method according to an embodiment of the present disclosure may be included and provided in a computer program product. The computer program product may be traded as a product between a seller and a buyer. The computer program product may be distributed in the form of a machine-readable storage medium (e.g., compact disc read only memory (CD-ROM)), or be distributed (e.g., downloaded or uploaded) online via an application store (e.g., Play Store™), or between two user devices (e.g., smart phones) directly. If distributed online, at least part of the computer program product may be temporarily generated or at least temporarily stored in the machine-readable storage medium, such as memory of the manufacturer's server, a server of the application store, or a relay server.

According to an embodiment, each component (e.g., a module or a program) of the above-described components may include a single entity or multiple entities. One or more of the above-described components may be omitted, or one or more other components may be added. Alternatively or additionally, a plurality of components (e.g., modules or programs) may be integrated into a single component. In such a case, the integrated component may still perform one or more functions of each of the plurality of components in the same or similar manner as they are performed by a corresponding one of the plurality of components before the integration. Operations performed by the module, the program, or another component may be carried out sequentially, in parallel, repeatedly, or heuristically, or one or more of the operations may be executed in a different order or omitted, or one or more other operations may be added.

While the present disclosure has been shown and described with reference to certain embodiments thereof, it will be understood by those skilled in the art that various changes in form and details may be made therein without departing from the spirit and scope of the present disclosure as defined by the appended claims and their equivalents.

What is claimed is:

1. An electronic device, comprising:
   a housing;
   a touch screen display disposed within the housing and exposed through at least a portion of the housing;
   a camera;
   a wireless communication circuit disposed within the housing;
   a position sensor;
   a pressure sensor;
   a motion sensor;
   a processor disposed within the housing and operatively connected to the display, the camera, the wireless communication circuit, the position sensor, and the motion sensor; and
   a memory disposed within the housing and operatively connected to the processor,
   wherein the memory is configured to store instructions causing, upon execution, the processor to:
   capture an image by using the camera,
   receive the captured image from the camera,
   receive position data associated with the captured image from the position sensor,
   receive orientation data associated with the captured image from the motion sensor,
   receive a first user input of a three dimensional (3D) geometric form on the captured image,
   receive a second user input including a first letter of an object at least partially overlapping the first user input of the 3D geometric form through the display, wherein a first pressure level is extracted from the second user input using the pressure sensor,
   receive a third user input including a second letter of the object at least partially overlapping the first user input of the 3D geometric form through the display, wherein a second pressure level is extracted from the second user input using the pressure sensor,
   receive a fourth user input constructing the 3D geometric form to completely surround the object,
   change a 3D depth of the first letter of the object added to the captured image based on the first pressure level and change a 3D depth of the second letter of the object added to the captured image based on the second pressure level, wherein the 3D depth of the first letter is a different depth than the 3D depth of the second letter,
   change a 3D direction of the object added to the captured image based on the fourth user input, and
   transmit the object, the captured image, the position data, the orientation data, and the 3D geometric form to an external server through the wireless communication circuit.

2. The electronic device of claim 1, wherein the instructions further cause, upon execution, the processor to receive the first user input, the second user input, the third user input, or the fourth user input using a stylus pen.

3. The electronic device of claim 2, wherein the instructions further cause, upon execution, the processor to:
   receive tilt information from the stylus pen, and
   rotate the object at least in part, based on the received tilt information.

4. The electronic device of claim 1, wherein the object includes writing text that includes at least one of a symbol, a geometric form, and an image.

5. The electronic device of claim 1, wherein the instructions further cause, upon execution, the processor to:
   change a direction of the object in accordance with the 3D geometric form, and
   transmit information about the changed 3D direction to the external server.

6. The electronic device of claim 5, wherein the object is moved on the display without displaying the 3D geometric form.

7. The electronic device of claim 5, wherein the instructions further cause, upon execution, the processor to:
   identify 3D-related information corresponding to the 3D geometric form, and
   change the direction of the object, based on the identified 3D-related information.

8. The electronic device of claim 7, wherein the 3D-related information includes data on at least one of coordinates, angle, slope, width, length, height, and area, which corresponds to the 3D geometric form.

9. The electronic device of claim 1, wherein the instructions further cause, upon execution, the processor to:
receive a multi-touch input, and
rotate the object at least in part, based on the received multi-touch input.

10. The electronic device of claim 9, wherein the multi-touch input includes a first touch input for determining a rotation axis of the object, and a second touch input for determining a rotation direction of the object.

11. The electronic device of claim 1, wherein the instructions further cause, upon execution, the processor to:
generate the object in accordance with the received second user input, and
store the generated object in the memory.

12. A system, comprising:
a network interface;
a processor operatively connected to the network interface; and
a memory operatively connected to the processor,
wherein the memory is configured to store instructions causing, upon execution, the processor to:
receive first data from a first external electronic device including a display and a camera via the network interface, wherein the first data includes an image, position data associated with the image, orientation data associated with the image, and an object generated in response to a first user input of a three dimensional (3D) geometric form on the image, a second user input including a first letter of the object at least partially overlapping the first user input of the 3D geometric form, a third user input including a second letter of the object at least partially overlapping the first user input of the 3D geometric form, and a fourth user input constructing the 3D geometric form to completely surround the object,
process the first data such that a 3D depth of the first letter of the object is changed based on a first amount of pressure applied by the second user input, a 3D depth of the second letter of the object is changed based on a second amount of pressure applied by the third user input, and a 3D direction of the object is applied on the image based on, at least in part, the position data, the orientation data, the first user input, the second user input, the third user input, or the fourth user input received from the first external electronic device, and
transmit the processed first data to another external electronic device via the network interface.

13. The system of claim 12, wherein the instructions further cause, upon execution, the processor to:
receive an image, position data associated with the image, and orientation data associated with the image from a second external electronic device including a display and a camera via the network interface, and
transmit the object to the second external electronic device via the network interface such that the object is displayed on the display of the second external electronic device, wherein the orientation data is applied to the displayed object.

14. The system of claim 12, wherein the instructions further cause, upon execution, the processor to:
transmit the object to the another external electronic device, wherein a direction of the object is changed in accordance with the 3D geometric form.

15. The system of claim 14, wherein the object is moved to the another external electronic device without displaying the 3D geometric form.

16. The system of claim 14, wherein the instructions further cause, upon execution, the processor to:
identify 3D-related information corresponding to the 3D geometric form, and
transmit the direction changed object to the another external electronic device, based on the identified 3D-related information.

17. The system of claim 12, wherein the instructions further cause, upon execution, the processor to:
receive a multi-touch input, and
rotate the object at least in part, based on the received multi-touch input.

18. The system of claim 12, further comprising:
a stylus pen,
wherein the instructions further cause, upon execution, the processor to:
receive tilt information from the stylus pen, and
rotate the object at least in part, based on the received tilt information.

* * * * *